(12) United States Patent
Palmer et al.

(10) Patent No.: US 10,888,776 B2
(45) Date of Patent: Jan. 12, 2021

(54) HANDHELD CONTROLLERS WITH DETACHABLE OVERLAYS

(71) Applicant: Valve Corporation, Bellevue, WA (US)

(72) Inventors: Austin Palmer, Seattle, WA (US); Cheang Tad Yoo, Bothell, WA (US); Brian David Hensley, Seattle, WA (US); Michael J. Goerz, Snohomish, WA (US); Scott Dalton, Seattle, WA (US); Ian Campbell, Seattle, WA (US); Christopher Lee Bjordhal, Snoqualmie Pass, WA (US); Jeffrey Peter Bellinghausen, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/201,782

(22) Filed: Nov. 27, 2018

(65) Prior Publication Data
US 2020/0164269 A1 May 28, 2020

(51) Int. Cl.
*G06F 3/00* (2006.01)
*G06F 1/16* (2006.01)
(Continued)

(52) U.S. Cl.
CPC .......... *A63F 13/24* (2014.09); *A63F 13/214* (2014.09); *G06F 3/03547* (2013.01); *A63F 2300/1043* (2013.01); *A63F 2300/1068* (2013.01)

(58) Field of Classification Search
CPC .............. G06F 1/1607; G06F 3/03547; G06F 3/04886; G06F 3/016
See application file for complete search history.

(56) References Cited

U.S. PATENT DOCUMENTS 5,572,573 A * 11/1996 Sylvan .............. H04M 1/27475
455/556.2
5,579,036 A * 11/1996 Yates, IV ................ G06F 3/044
178/18.06

(Continued)

OTHER PUBLICATIONS

Office Action for U.S. Appl. No. 16/134,612, dated Oct. 24, 2019, Goerz, "Handheld Controllers With Swappable Controls", 23 pages.

(Continued)

*Primary Examiner* — Steven J Hylinski
(74) *Attorney, Agent, or Firm* — Lee & Hayes, P.C.

(57) ABSTRACT

Described herein are, among other things, handheld controllers that include one or more touchpads (i.e., touch-sensitive controls) configured to detachably couple to one or more overlays that effectively transform the respective touchpad into a different control. For instance, one example handheld controller may include a circular trackpad that is configured to detect a position of a finger on a top surface of the trackpad. This position may be used to control a cursor or avatar, for scrolling, or for any other type of command. In general, most or all of the top surface may be usable by a user for providing input to the controller and/or a remote system coupled to the controller. As described herein, however, one or more different overlays may detachably couple to a housing of the controller and/or the trackpad itself to effectively change the use of the trackpad.

19 Claims, 17 Drawing Sheets

(51) Int. Cl.
*A63F 13/24* (2014.01)
*A63F 13/214* (2014.01)
*G06F 3/0354* (2013.01)

(56) References Cited

U.S. PATENT DOCUMENTS

| | | | | |
|---|---|---|---|---|
| 6,636,203 | B1* | 10/2003 | Wong | G06F 3/04886 |
| | | | | 178/18.01 |
| 7,324,642 | B2* | 1/2008 | Pletikosa | G06F 1/1626 |
| | | | | 361/679.27 |
| 7,403,191 | B2* | 7/2008 | Sinclair | G06F 3/0224 |
| | | | | 345/168 |
| 7,479,943 | B1* | 1/2009 | Lunsford | G06F 3/0224 |
| | | | | 345/157 |
| 8,279,183 | B2* | 10/2012 | Ladouceur | G06F 3/041 |
| | | | | 345/173 |
| 8,416,065 | B2* | 4/2013 | Pasquero | G06F 3/04886 |
| | | | | 340/407.2 |
| 8,421,761 | B2* | 4/2013 | Natanzon | G06F 3/04842 |
| | | | | 345/156 |
| 8,547,340 | B2* | 10/2013 | Sizelove | B64D 11/0015 |
| | | | | 345/173 |
| 8,952,899 | B2* | 2/2015 | Hotelling | G06F 3/0304 |
| | | | | 345/173 |
| 8,994,666 | B2* | 3/2015 | Karpfinger | G06F 3/0202 |
| | | | | 345/173 |
| 9,041,665 | B2* | 5/2015 | Skinner | G06F 3/03547 |
| | | | | 345/173 |
| 9,158,390 | B2* | 10/2015 | Petersen | G06F 3/033 |
| 9,261,965 | B2* | 2/2016 | King | G06F 3/016 |
| 9,411,467 | B2* | 8/2016 | Argiro | G06F 3/016 |
| 9,547,336 | B2* | 1/2017 | Lee | H04M 1/0214 |
| 9,645,721 | B2* | 5/2017 | Horne | G06F 3/04847 |
| 9,671,828 | B2* | 6/2017 | Lee | G06F 1/1652 |
| 9,737,242 | B2* | 8/2017 | Alberts | A61B 5/1124 |
| 9,910,515 | B2* | 3/2018 | Richards | G06F 3/04847 |
| 2003/0193481 | A1* | 10/2003 | Sokolsky | G06F 3/0488 |
| | | | | 345/173 |
| 2003/0235452 | A1* | 12/2003 | Kraus | B41J 5/102 |
| | | | | 400/472 |
| 2005/0255915 | A1 | 11/2005 | Riggs et al. | |
| 2006/0181515 | A1* | 8/2006 | Fletcher | G06F 3/04886 |
| | | | | 345/173 |
| 2006/0256090 | A1* | 11/2006 | Huppi | A63F 13/02 |
| | | | | 345/173 |
| 2007/0222765 | A1* | 9/2007 | Nyyssonen | G06F 1/1607 |
| | | | | 345/173 |
| 2008/0238879 | A1* | 10/2008 | Jaeger | G06F 3/03545 |
| | | | | 345/173 |
| 2009/0079705 | A1* | 3/2009 | Sizelove | B64D 11/0015 |
| | | | | 345/173 |
| 2010/0079403 | A1* | 4/2010 | Lynch | G06F 3/0202 |
| | | | | 345/174 |
| 2010/0097327 | A1* | 4/2010 | Wadsworth | G06F 3/04886 |
| | | | | 345/173 |
| 2010/0328052 | A1* | 12/2010 | Pasquero | H04M 1/72594 |
| | | | | 340/407.2 |
| 2011/0050587 | A1* | 3/2011 | Natanzon | G06F 3/04842 |
| | | | | 345/173 |
| 2011/0105231 | A1 | 5/2011 | Ambinder et al. | |
| 2011/0157056 | A1* | 6/2011 | Karpfinger | G06F 3/0202 |
| | | | | 345/173 |
| 2011/0227841 | A1* | 9/2011 | Argiro | G06F 3/016 |
| | | | | 345/173 |
| 2011/0248947 | A1* | 10/2011 | Krahenbuhl | G06F 1/1643 |
| | | | | 345/174 |
| 2011/0306423 | A1 | 12/2011 | Calderon | |
| 2012/0169597 | A1* | 7/2012 | Liotta | G06F 3/0338 |
| | | | | 345/161 |
| 2012/0256862 | A1* | 10/2012 | Wagner | G06F 3/048 |
| | | | | 345/173 |
| 2012/0280087 | A1 | 11/2012 | Coffman et al. | |
| 2013/0181935 | A1* | 7/2013 | McKenzie | G06F 3/044 |
| | | | | 345/174 |
| 2013/0215029 | A1* | 8/2013 | Comer, Jr. | G06F 3/016 |
| | | | | 345/161 |
| 2014/0253445 | A1* | 9/2014 | Petersen | G06F 3/033 |
| | | | | 345/161 |
| 2015/0084900 | A1 | 3/2015 | Hodges et al. | |
| 2015/0154935 | A1* | 6/2015 | Won | G06F 3/048 |
| | | | | 345/156 |
| 2016/0048261 | A1* | 2/2016 | Argiro | G06F 3/016 |
| | | | | 345/174 |
| 2016/0103546 | A1* | 4/2016 | Hemminki | G06F 1/1632 |
| | | | | 345/173 |
| 2016/0361635 | A1 | 12/2016 | Schmitz | |
| 2020/0086211 | A1 | 3/2020 | Goerz et al. | |

OTHER PUBLICATIONS

The PCT Search Report and Written Opinion dated Nov. 14, 2019 for PCT application No. PCT/US19/51048, 15 pages.
The PCT Search Report and Written Opinion dated Jan. 17, 2020 for PCT Application No. PCT/US2019/063376, 7 pages.
Final Office Action dated Apr. 9, 2020 for U.S. Appl. No. 16/134,612 "Handheld Controllers With Swappable Controls", Goerz, 40 pages.

* cited by examiner

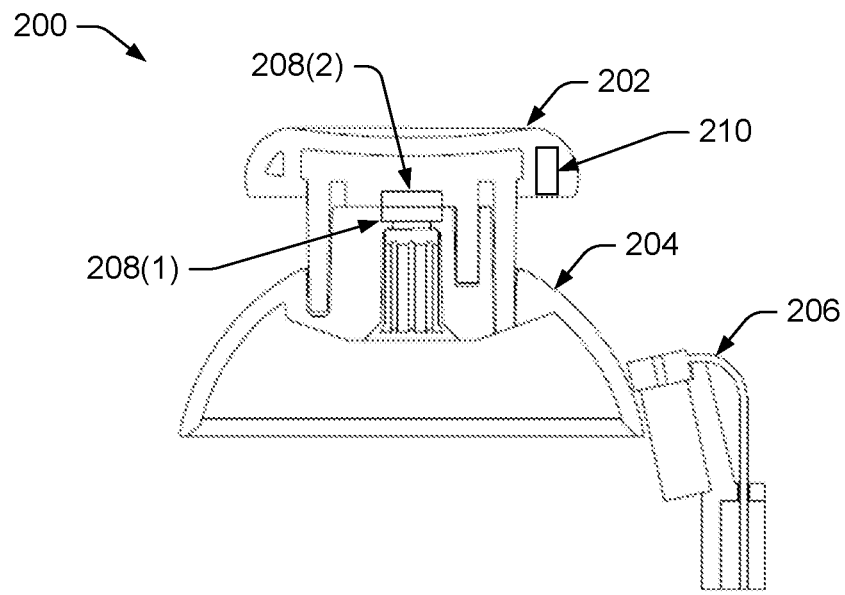
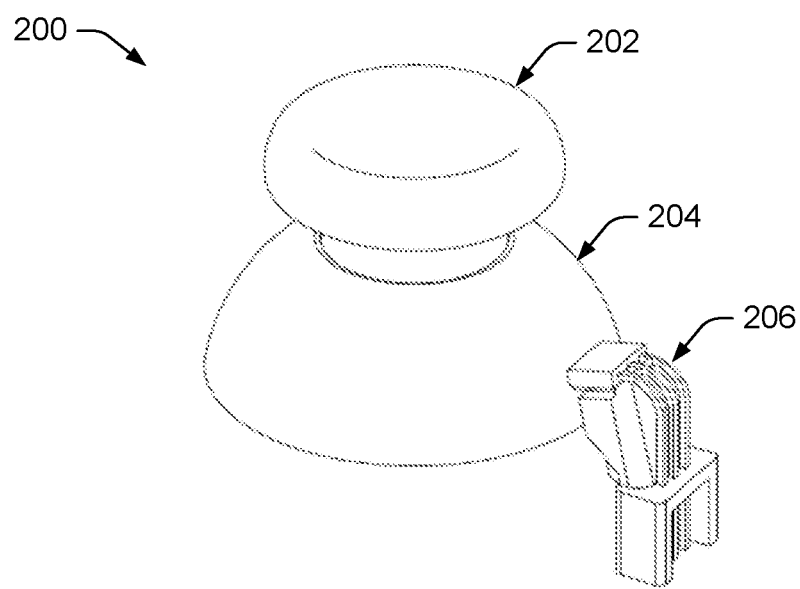
FIG. 2

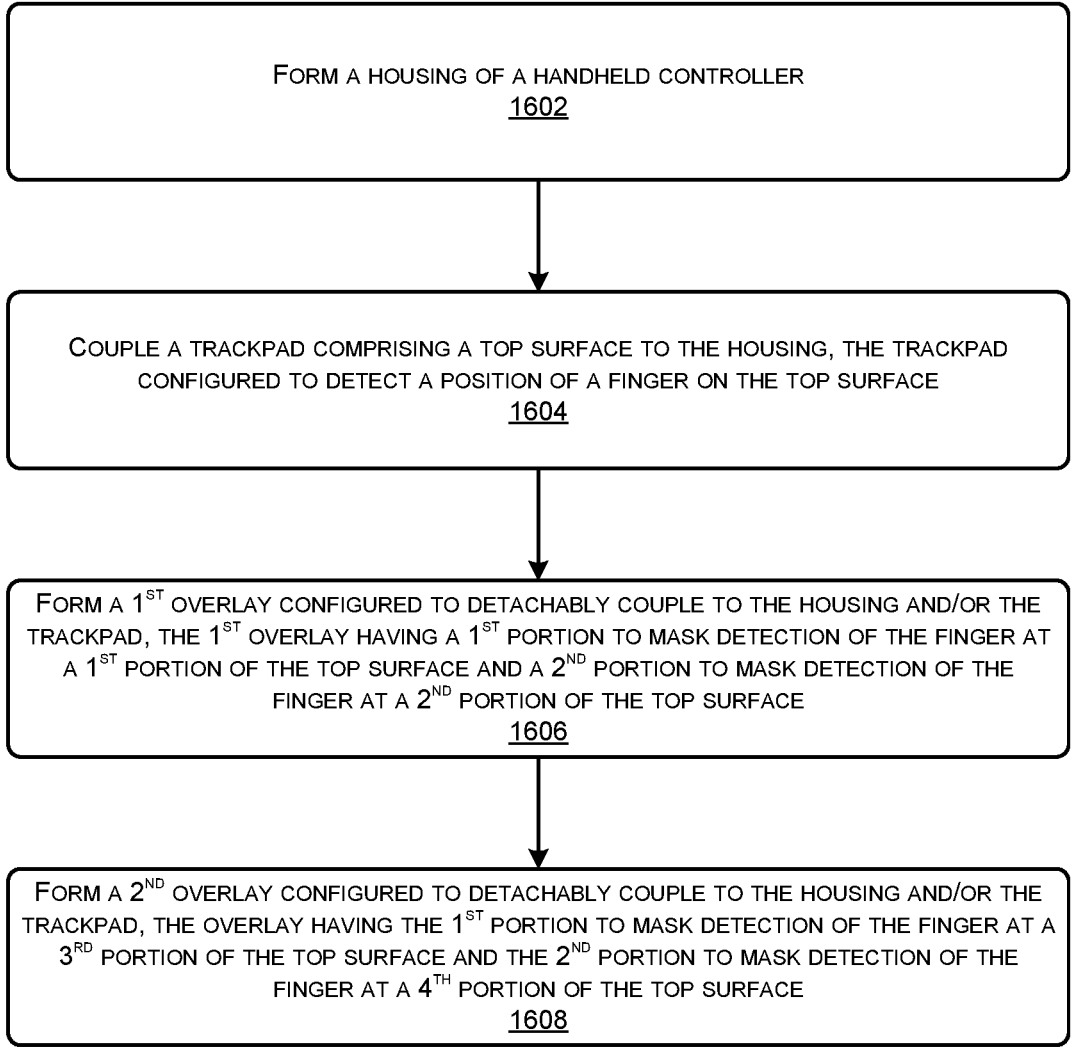

```
                                    ┌─ 1600
```

FORM A HOUSING OF A HANDHELD CONTROLLER
1602

COUPLE A TRACKPAD COMPRISING A TOP SURFACE TO THE HOUSING, THE TRACKPAD CONFIGURED TO DETECT A POSITION OF A FINGER ON THE TOP SURFACE
1604

FORM A 1$^{ST}$ OVERLAY CONFIGURED TO DETACHABLY COUPLE TO THE HOUSING AND/OR THE TRACKPAD, THE 1$^{ST}$ OVERLAY HAVING A 1$^{ST}$ PORTION TO MASK DETECTION OF THE FINGER AT A 1$^{ST}$ PORTION OF THE TOP SURFACE AND A 2$^{ND}$ PORTION TO MASK DETECTION OF THE FINGER AT A 2$^{ND}$ PORTION OF THE TOP SURFACE
1606

FORM A 2$^{ND}$ OVERLAY CONFIGURED TO DETACHABLY COUPLE TO THE HOUSING AND/OR THE TRACKPAD, THE OVERLAY HAVING THE 1$^{ST}$ PORTION TO MASK DETECTION OF THE FINGER AT A 3$^{RD}$ PORTION OF THE TOP SURFACE AND THE 2$^{ND}$ PORTION TO MASK DETECTION OF THE FINGER AT A 4$^{TH}$ PORTION OF THE TOP SURFACE
1608

FIG. 16

HANDHELD CONTROLLERS WITH DETACHABLE OVERLAYS

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, or the like. While current handheld controllers provide a range of functionality, further technical improvements may enhance user experiences that these controllers offer.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIG. 1 is a front view of an example handheld controller that includes, in part, a receiver that is configured to detachably couple to different controls, such as a joystick, directional pad (D-pad), and the like.

FIG. 2 illustrates a cross-sectional view and a perspective view of a receiver of the handheld controller of FIG. 1 when coupled to a detachable joystick. As illustrated, the controller includes a Hall effect sensor in this example for determining that the controller is currently coupled to the joystick.

FIG. 16 is a flow diagram of an example process for forming a handheld controller that includes an overlay configured to detachably couple to a trackpad of the handheld controller.

DETAILED DESCRIPTION

Figure 1:
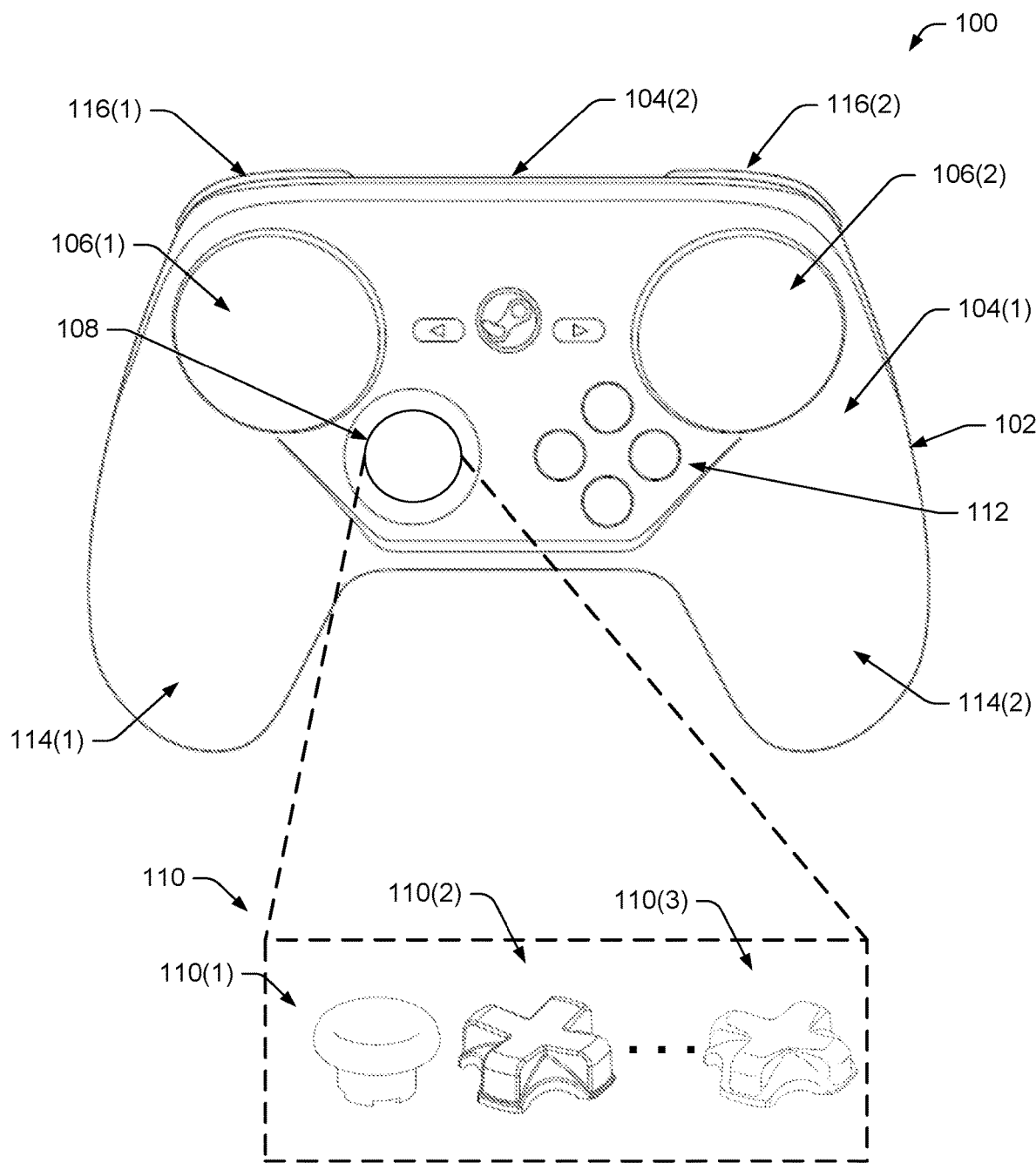

As described above, handheld controllers are used in a range of environments and include a range of functionality. However, traditional handheld controllers include a static configuration in terms of the controls operable by a user. That is, traditional handheld controllers typically include the same controls that are used across different applications, such as different game titles or the like. Furthermore, these same controls are used by each user of the handheld controller despite the fact that different users may have different configuration needs and/or preferences.

Described herein are, among other things, handheld controllers configured to detachably couple to different controls, as well as methods for use and/or assembling the handheld controllers. The handheld controllers described herein thus allow for the dynamic swapping of controls for changing the configuration of the controller to meet the needs of different applications (e.g., game titles), users, and the like. For example, a first gaming application may be best played with use of a first control, such as a joystick, coupled to the controller, while a second gaming application may be best played with user of a second control, such as a direction pad (D-pad). Thus, a user may swap the first control with the second control, or vice versa, depending on the gaming application currently executing. In addition, or in the alternative, a first user may prefer a first control, such as a relatively tall joystick having a convex-shaped cap, while a second user may prefer a second control, such as a shorter joystick having a concave-shaped cap. Again, the handheld controller may be dynamically configured depending on which user is currently operating the controller. Furthermore, in each of these instances the handheld controller or a remote system may determine, in near-real-time, which control currently couples to the controller and may provide this information to the system executing the current application, which in turn may make modifications based on the configuration of the handheld controller. Thus, the techniques described herein enable a dynamically configurable handheld controller that remedies some of the current deficiencies of traditional handheld controllers, as discussed above.

In addition, the handheld controllers described herein may include one or more touchpads (i.e., touch-sensitive controls) configured to detachably couple to one or more overlays that effectively transform the respective touchpad into a different control. For instance, one example handheld controller may include a capacitive or conductive circular trackpad that is configured to detect a position of a finger on a top surface of the trackpad. In some instances, the trackpad may be circular, while in other instances the trackpad may be oval, rectangular, polygonal, or of any other shape. Further, the trackpad may utilize a capacitive touch sensor, a conductive touch sensor, a resistive touch sensor, an infrared touch sensor, and/or any other type(s) of touch-sensor technology for detecting a position of a finger on the trackpad. This position may be used to control a cursor or avatar, for scrolling, or for any other type of command. In general, most or all of the top surface may be usable by a user for providing input to the controller and/or a remote system coupled to the controller. As described below, however, one or more different overlays may detachably couple to a housing of the controller and/or the trackpad itself to effectively change the use of the trackpad.

In one example, the overlay is shaped similarly to the trackpad (e.g., circular) and includes a first portion that effectively masks detection of a finger at a particular portion of the top surface of the trackpad and a second portion that enables detection of the finger at a different portion of the top surface. For instance, the overlay may comprise a stencil that includes a first portion that, when coupled to the trackpad, covers a first portion of the trackpad and a second portion that exposes a second portion of the trackpad. For instance, the overlay may comprise an insulative material (e.g., plastic, etc.) that covers a portion of the top surface of the trackpad with one or more recesses that expose a different portion of the top surface. Therefore, when the overlay couples to the controller, a user may operate the trackpad at the locations that are exposed by the overlay while being unable to provide input to the trackpad at other locations. In another example, the overlay may comprise a first, insulative material that masks detection of the finger at certain portions of the top surface of the trackpad and a second, conductive, capacitive, or resistive material that, when pressed by a finger of a user onto the top surface of the trackpad, results in detection of the finger or other input device (e.g., a stylus) at the selected location of the top surface. In still other instances, the overlay may comprise a single material but may be thinner at certain regions to enable detection of the user's fingers through the thinner material. That is, the overlay may be shaped similar to a stencil, but may include thin regions rather than exposed regions.

The overlays described herein may couple to the housing and/or the trackpads in any number of ways. For example, the overlays may couple magnetically, via an interference fit, via an adhesive, and/or the like. Further, the overlays may transform the otherwise open trackpad into any type of control, such as a cross-shaped control that allows up, down, left, and right selection by the user, a vertical control that allows up and down selection, a horizontal control that allows left and right selection, a button control that includes circular (or other shaped) holes or conductive/capacitive/resistive sections that correspond to selectable buttons, a radial control that allows for radially arrange selectable regions, and/or the like. While a few examples have been described, it is to be appreciated that the controls may include any other number of controls. Further, in some instances, a user may swap out the overlays to change the resulting control offered by the trackpad/overlay combination depending on the desires of the user, requirements of a game title, or the like. Further, the techniques described herein for identifying different controls coupled to the handheld controller may apply equally to determining the identity of a particular overlay coupled to the handheld controller at a given time. For example, an overlay may include an RFID chip, a hall-effect-sensor magnet, or other functionality that may be used to identify the coupled overlay. In some instances, a handheld controller may include multiple trackpads, which may detachably couple to different respective overlays.

In some instances, an overlay may have a form factor or shape that substantially matches the form factor or shape of the trackpad to which the overlay couples. In other instances, the overlay may have a form factor or shape that differs from the form factor or shape of the trackpad. For example, a square overlay may couple atop a circular trackpad. In this example, the overlay may include an RFID chip, a hall-effect-sensor magnet, or the like residing at a portion of the overlay that is adjacent to, but not atop, the trackpad when the overlay couples to the trackpad.

In still other instances, overlays may be recognized based on capacitive, conductive, and/or resistive footprints of the respective overlays. That is, each overlay may include one or more protrusions on a bottom side of the overlay that uniquely identifies the overlay when it couples to the trackpad. That is, the protrusions may contact the trackpad when coupled such that the resulting touch-sensor values detected by the trackpad is uniquely identifiable by the handheld controller, the gaming console, a remote system (e.g., a server), or any other device in direct or indirect communication with the controller.

In some instances, the controller, the console, the remote system, or the like may alter certain functionality based on which overlay currently couples to the trackpad. For example, when the controller, console, or system identifies that a left/right/up/down overlay couples to the trackpad, the gaming console may only accept input corresponding to these directions and may disregard other touch inputs (e.g., touch inputs in the diagonal directions). In addition or in the alternative, the software/firmware of the controller, console, or remote system may amplify touch inputs received at certain locations, disregard or attenuated touch inputs received at other locations, change touch thresholds associated with different regions of the trackpad, turn on or off certain regions of the trackpad, or the like, depending upon which controller currently couples to the trackpad. When, for example, the left/right/up/down overlay couples to the trackpad, the controller, console or system, may turn off touch sensors outside of the regions associated with the left/right/up/down regions, may alter the thresholds within and outside of the regions (e.g., may make the thresholds outside of these regions relatively high and/or may make the thresholds within these left/right/up/down regions relatively low), or the like.

In some instances, a handheld controller as described herein may be used to control a remote device (e.g., a television, audio system, personal computing device, game console, etc.), to engage in video game play, and/or the like. The handheld controller may include one or more controls, including one or more front-surface controls on a front surface of a housing of the handheld controller. These front-surface controls may include one or more joysticks, directional pads (D-pads), trackpads, trackballs, buttons, or other controls that are controllable, for instance, by a thumb of a user of the handheld controller. Additionally, or alternatively, the handheld controller may include one or more top-surface controls residing on a top surface of a housing of the handheld controller. For example, these top-surface controls may be referred to as "triggers", "bumpers", or the like and may be controllable by one or more fingers of the user, such as a middle finger, an index finger, or the like. In some instances, the handheld controller includes one or more left top-surface controls that are operable by one or more fingers of a left hand of the user and one or more right top-surface controls that are operable by one or more fingers of a right hand of the user. In addition, the handheld controller may include one or more back-surface controls, such as one or more buttons on a back cover of the controller that is also used to provide access to batteries of the controller. In some instances, the back-surface controls may include one or more controls operable by a left hand of a user and one or more controls operable by a right hand of the user.

In some instances, the handheld controller may include a housing having one or more receiver portions for detachably coupling to one or more controls. For example, the housing may include, on a front surface of the housing, a receiver that is configured to detachably couple to one or more joysticks, one or more D-pads, one or more track pads, one or more buttons, and/or the like. In some instances, a user may swap a first control for a second control based on a current application (e.g., game title) that the user is playing, based on comfort of the user, and/or for any other reason. Furthermore, while the above example describes detachable front-surface controls, in other instances the controller may additionally or alternatively include one or more detachable top-surface controls, back-surface controls, and/or the like.

In some instances, the handheld controller or a system communicatively coupled to the controller may determine the current control(s) coupled to the controller, such as the joystick, D-pad, or the like. In one example, the handheld controller may include a Hall effect sensor for use in identifying which control is currently coupled to the controller. In these instances, each control may include a different magnet configuration and, when a respective control couples to the receiver of the housing of the controller, the Hall effect sensor may vary its voltage in response to the magnetic field caused by the magnetic configuration of the respective control. The controller, or the system coupled to the controller, may then map this voltage to a known control, such as a joystick, D-pad, or the like. That is, because each magnet configuration of the controls may be unique relative to each other control, the resulting magnetic field and, hence, voltage generated by the Hall effect sensor may likewise be unique. The controller or the system in communication with the controller may store a table or other data structure associating each voltage with particular identification data identifying a particular control.

As used herein, a magnet configuration may include a strength of a magnet, a position or location of the magnet, an orientation of the magnet, a number of magnets used, and/or any combinations thereof. For instance, a first control may include a magnet of a first strength oriented in a first direction. A second control may include a magnet also of the first strength but oriented in a second direction (e.g., opposite the first direction). A third control may include a magnet of a second strength, while a fourth control may include two magnets at particular locations and a fifth control may include a particular number of particular-strength magnets and predefined locations and orientations, and so forth. In each of these instances, the generated magnetic field, and thus the voltage generated by the Hall effect sensor, may be unique relative to each other control such that each control may be disambiguated relative to each other control. Furthermore, in some instance, one control might not include a magnet such that the absence of a magnetic field detected by the Hall effect sensor uniquely identifies that particular control.

After identifying the control currently coupled to the housing of the handheld controller, the handheld controller and/or the system may relay the identification of the control of the application being executed by the system. The system may then take this information into account for determining one or more parameters of the application. For example, calibration and scaling factors associated with the movement of the control as translated to movement on a display may be updated to reflect the current control. In another example, the application (e.g., game) may enable different movement/control options based on which control currently couples to the receiver. In yet another example, the configuration of the controller may be used to determine content to recommend or otherwise surface to a user. For example, if a controller currently couples to a back-cover control having four buttons as opposed to two, then a gaming application or platform may recommend games that are compatible with (e.g., include features utilized by) the four-button, back-cover control. Of course, while a few examples have been described, it is to be appreciated that the system and/or controller may use this information in one or more other ways.

In some instances, for example, in response to determining that a first D-pad that movable in eight directions (e.g., up, down, left, right, up/left, down/left, up/right, down/left) is coupled to the handheld controller, the controller and/or a remote system may amplify the signal in these eight directions corresponding to the current direction of input provided by a user. However, when the controller determines that a second D-pad that is movable in four directions (e.g., left, right, up, and down) couples to the controller, the controller and/or the remote system may amplify the signal from this control these four directions, again corresponding to the input of the user. After amplifying the signal, the controller and/or the remote system may apply thresholds to the values of the signals in each of the number of directions and may determine which of the value is greater than a threshold. If the controller and/or remote system determines that a particular value (e.g., corresponding to "left" or "up/right") is greater than the threshold, then the controller and/or remote system may interpret this as the input (e.g., may move the user's aviator to the left in the first example or up and to the right in the second example). Stated otherwise, the controller and/or the remote signal may "boost" the signal received from the coupled D-pad and apply a threshold to each signal associated with each direction such that each of the four, eight, or other number of directions corresponds to either an "on" or "off" reading.

In addition, other techniques may be utilized for determining which control currently couples to the handheld controller. For example, radio-frequency identification (RFID) techniques may be utilized for uniquely identifying each control that detachably couples to the controller. In these examples, the housing (e.g., proximate the receiver) may include an RFID reader that is configured to send an RFID signal, while each control may include an RFID tag configured to receive the RFID signal and provide, in response, identification data that uniquely identifies the control relative to other controls configured to detachably couple to the controller. In some instances, the RFID tags may comprise active tags, passive tags, or the like. Furthermore, while the above example describes the housing of the handheld controller including the RFID reader, in some instances each control may include a respective reader while the housing may include an RFID tag.

In still other examples, the handheld controller may utilize optical sensors, capacitive sensors, embedded resistors, and/or any other type of hardware to identify which particular control currently couples to the housing of the controller.

In still other instances, the detachable controls may be identified using one or more software-based detection methods. For example, given that each control may have a different physical form factor, each control may be operable by a user in different ways. That is, while a joystick that couples to the receiver of the housing may be movable in all directions (i.e., 360 degrees), a first D-pad may only be movable in eight directions (e.g., up, down, left, right, up/left, down/left, up/right, down/left), while a second D-pad may only be movable in four (e.g., left, right, up, and down) and a third D-pad in only two (e.g., left and right or up and down). The handheld controller, or an application executing on a system communicatively coupled to the handheld controller may receive movements made via a coupled control over time to identify the particular control currently coupled to the controller. For example, if the application receives indications, over time, indicative of the user manipulating the control in only four directions (e.g., left, right, up, down), then the application may determine that the controller currently couples to the second D-pad discussed above. If, however, the application receives indications, over time, indicative of the user manipulating the control in all directions, then the application may determine that the controller currently couples to the joystick. Of course, while a few examples have been described, it is to be appreciated that the techniques may identify which control currently couples to the controller in multiple other ways.

While traditional handheld controllers include a fixed number and a fixed type of controls, the controllers described herein allow for different configurations that may be tailored to individual users and/or to applications that are being executed via the controllers. This configurability enriches the use of these controllers and, hence, the experience of users operating the controllers.

FIG. 1 is a front view of an example handheld controller 100 that may include a receiver that is configured to detachably couple to different controls, such as a joystick, directional pad (D-pad), and the like.

As illustrated, the handheld controller 100 includes a housing 102 having a front surface 104(1) and a top surface 104(2) potentially along with a back surface opposite the front surface 104(1) and a bottom surface opposite the top surface 104(2). The front surface 104(1) may include one or more front-surface controls that are, in some instances, controllable by one or more thumbs of a user operating the handheld controller 100. These front-surface controls may include one or more trackpads, trackballs, joysticks, buttons, or the like, as described in more detail below. In this example, the front surface 104(1) includes a left trackpad 106(1) controllable by a left thumb of a user and a right trackpad 106(2) controllable by a right thumb of the user. In addition, the example controller 100 includes a receiver 108 that is configured to detachably couple to one or more controls 110, such as a joystick 110(1), a first D-pad 110(2), a second D-pad 110(3), and so forth. When coupled to the controller, each of these controls 110 may be, for example, controllable by a left thumb of the user. Of course, while FIG. 1 illustrates the handheld controller 100 as including the receiver 108 on the top surface 104(1) of the housing 102, in other instances the controller 100 may additionally or alternatively include one or more receivers on other surface(s) of the housing 102.

For example, and as described below, the handheld controller 100 may include a receiver on a back surface of the housing that is configured to receive different detachable back covers. These back covers, in addition to functioning as covers sitting atop a battery cavity of the controller 100, may also act as controls. For example, a first detachable back cover may include two buttons (one on each side of the back cover) while a second detachable back cover may include four buttons (two on each side). Again, the handheld controller 100 may be configured to identify which back cover the controller 100 currently couples to using the identification techniques described herein. Further, while a few example back covers and receiver positions have are described, it is to be appreciated that the handheld controller 100 may include receivers at varying locations configured to detachably couple to an array of different types of controls.

The controller may further include depressible buttons 112 (e.g., controllable by a right thumb of the user) and additional input controls. In this example, the handheld controller 100 also includes a left handle 114(1) and a right handle 114(2) by which a user may hold the controller 100 via right and left hands of the user, respectively.

The top surface 104(2), meanwhile, may include one or more top-surface controls. In the illustrated example, the controller 100 includes a left top-surface control 116(1) and a right top-surface control 116(2). The left top-surface control 116(1) may be operable by a left finger (e.g., middle finger or index finger) of the user, while the right top-surface control may be operable by a right finger (e.g., middle finger or index finger) of the user. The top-surface controls 116(1) and 116(2) may be referred to as "triggers" or "bumpers" in some instances. Furthermore, in some instances one or more of the top-surface controls 116(1) and 116(2) may include one or more touch sensors for detecting a presence, location, and/or gesture of one or more fingers of the user on the respective top-surface control.

In some instances, a user of the handheld controller 100 may interchange which of the controls 110 couples to the receiver 108 to change the functionality, look, or feel of the controller 100. For example, a user may choose to couple the joystick 110(1) to the receiver 108 when operating a first application, the first D-pad 110(2) when operating a second application, the second D-pad 110(3) when operating a third application, and so forth. In some instances, each of these controls may provide different functionality (e.g., movement in different directions). In still other instances, the user may select a control based on a look or feel of the control. For example, different controls may include different sizes, textures, shapes, heights, and so forth. In one example, different joysticks may have different heights, different shapes (e.g., convex, concave, flat, etc.), and so forth.

In each instance, the handheld controller may generate data used to identify which of the controls 110 currently couples to the receiver. In some instances, the handheld controller 100 may use this data to make this determination, while in other instances the handheld controller 100 may provide this data to a remote system (e.g., a game console in the local environment of the controller, a remote server executing an application controlled by controller 100, etc.) to make this determination. In each of these instances, the controller 100 may generate this data in an array of ways. For example, the handheld controller 100 may include an analog Hall effect sensor, a digital Hall effect sensor, an optical sensor, RFID functionality, or other functionality for generating data used to determine the control currently coupled to the receiver 108. In some instances, the handheld controller may track, over time, control-usage data indicating how the control is being operated by a user for determining which control is currently coupled to the receiver 108. For example, software executing on the control, on a game console, a remote server, and/or the like may use this control-usage data to identify a particular usage signature associated with a particular control. For example, if the control-usage data indicates that the control is being operated in a 360° manner, then the software (or firmware) may identify a usage signature associated with a joystick and, thus, may determine that a joystick is coupled to the receiver 108. Conversely, if the control-usage data indicates that the control is only being used in four directions (e.g., up, down, left, and right) then the software may identify a usage signature associated with a four-way D-pad and, thus, may determine that the four-way D-pad currently couples to the receiver 108. The following figures and accompanying description discuss these concepts in further detail below.

FIG. 2 illustrates a cross-sectional view and a perspective view of the example assembly 200 that includes a detachable joystick 202 coupled to a receiver 204 of a handheld controller, such as the handheld controller 100 of FIG. 1. As illustrated, in this example, the receiver portion couples to or is otherwise adjacent to a Hall effect sensor 206 configured to generate data for use in determining which detachable control currently couples to the receiver 204, as discussed below. While FIG. 2. Illustrates a single Hall effect sensor, in other instances the controller may include multiple such sensors. In these instances, each Hall-effect sensor may generate a different voltage reading and the combination of these readings may be used to uniquely identify the particular control coupled to the controller. In these instances, the control, such as the example joystick 202, may include multiple Hall-effect-sensor magnets, may include a single Hall-effect-sensor magnet or, as described above, might not include a Hall-effect-sensor magnet.

FIG. 2 further illustrates that the receiver 204 also includes a magnet 208(1), while the joystick 202 includes a magnet 208(2). In some instances, the magnets 208(1) and 208(2) are oriented such that they attract one another for detachable coupling the joystick 202 to the receiver 204. For instance, a south pole of the magnet 208(1) may be oriented upwards while a north pole of the magnet 208(2) may be oriented downwards (or vice versa) such that the receiver and the joystick magnetically couple, thus allowing a user of the controller to operate the controller using the joystick. In other instances, meanwhile, one of the magnets 208(1) or 208(2) may comprise magnetic metal rather than a magnet, resulting in a similar attraction for coupling the joystick 202 (or other control) to the receiver 204. For example, the controller 100 may include the magnet 208(1) that couples to a magnetic material residing at the location of the illustrated magnet 208(2) and in lieu of the magnet 208(2). In another example, the joystick 202 may include the magnet 208(2) that couples to a magnetic material residing at the location of the illustrated magnet 208(1) and in lieu of the magnet 208(1). Furthermore, while this example describes detachably coupling the joystick 202, or other control, to the receiver 204 via magnetic attraction, in other instances these components may additionally or alternatively couple via a force-fit connection or any other type of connection.

The Hall effect sensor 206, meanwhile may comprise a transducer that varies its output voltage in response to a magnetic field. To do so, the Hall effect sensor 206 may include a thin strip of metal to which a current is applied, such that when a magnetic field is applied to the thin strip of metal, electrons of the thin strip are deflected toward one edge. This deflection generates a voltage gradient across the strip and perpendicular to the flow of applied current.

Therefore, different ones of the controls 110 may include different magnetic configurations that generate different magnetic fields, thus creating different voltage gradients at the Hall effect sensor 206. These different gradients, or voltage measurements, may then be used to determine which control is coupled to the receiver 204. That is, the handheld controller or a system remote from the controller (e.g., a game console, a server, etc.) may store associations between respective voltage measurements and respective control identifiers (IDs). For instance, a first voltage measurement may be associated with a first control, a second measurement with a second control, and so forth.

In this example, the joystick 202 includes a Hall-effect-sensor magnet 210. As such, when the joystick 202 couples to the controller, the Hall-effect-sensor 206 may measure a particular voltage measurement, which the controller or another device may use to determine the identity of the currently coupled joystick 202. That is, the controller or another device (e.g., the game console, the server, etc.) may determine the device ID associated with the particular voltage measurement determined by the Hall-effect-sensor 206.

Further, and as discussed above, in some instance the absence of a voltage gradient may be associated with a particular control. For instance, a joystick might not include a Hall-effect-sensor magnet in close proximity to the sensor 206. Thus, the sensor may refrain from generating a gradient, which may be used as a signal in this example to indicate that the receiver 204 is currently coupled to the particular joystick.

Figure 3:
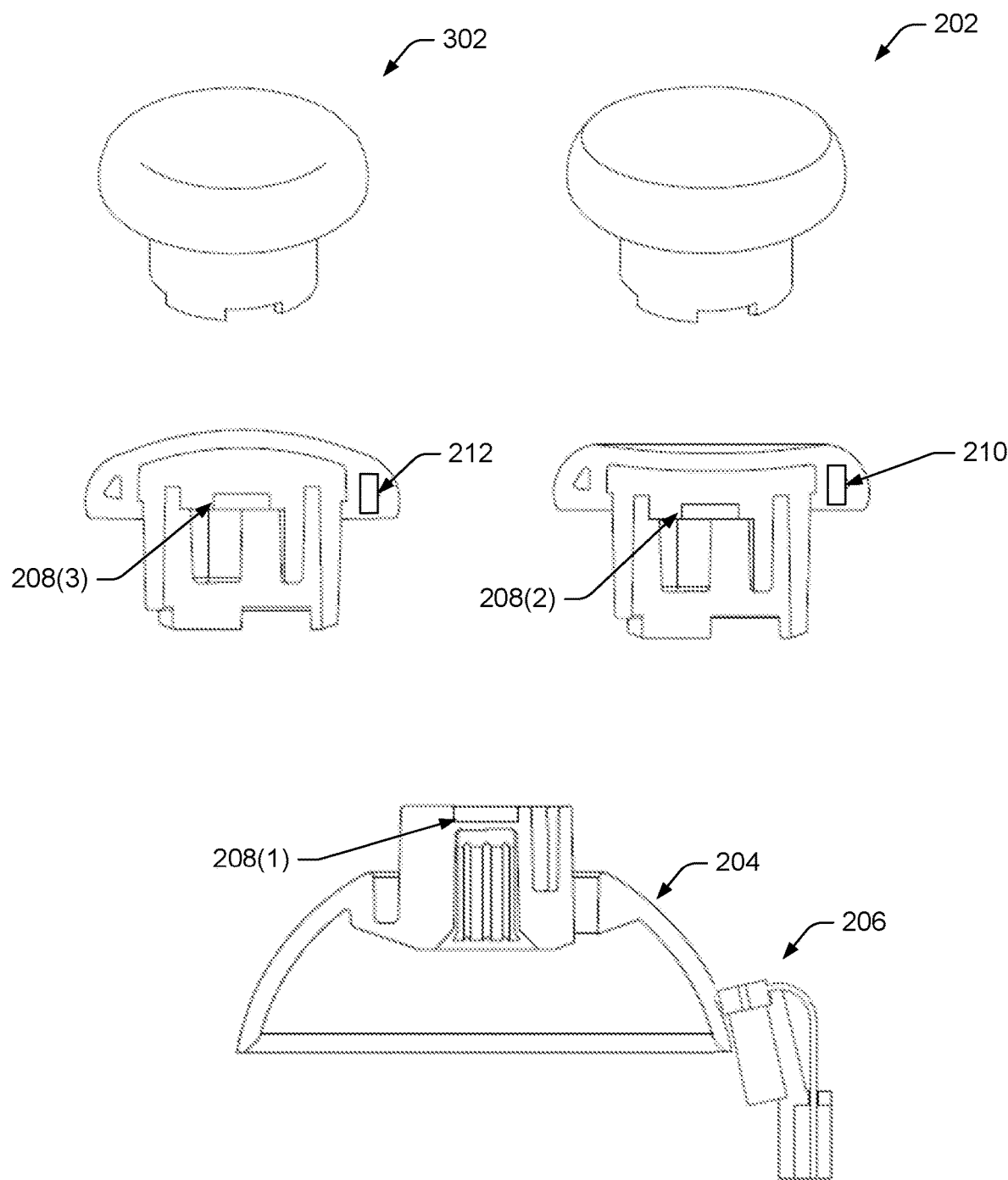
FIG. 3 illustrates perspective and cross-sectional views of two different detachable joysticks, as well as a cross-sectional view of a receiver of the handheld controller that may be configured to receive each of the different joysticks.

FIG. 3 illustrates perspective and cross-sectional views of two different detachable joysticks, as well as a cross-sectional view of a receiver of the handheld controller that may be configured to receive each of the different joysticks. The joystick on the right may comprise the joystick 202 illustrated with reference to FIG. 2. That is, this joystick 202 may comprise a relatively flat top, as compared to a joystick 302 having a convex top surface. As illustrated, each of the joysticks 202 and 302 may include a magnet 208(2) and 208(3), respectively, for magnetically coupling the respective joystick to the receiver 204 via the magnet 208(1). In some instances, the magnets 208(2) and 208(3) may comprise the same or substantially similar magnetic field oriented in the same direction. Furthermore, in this example, the joystick 202 includes the Hall-effect-sensor magnet 210 for use in identifying the joystick 202. The joystick 302, meanwhile, may include a Hall-effect-sensor magnet 212, such that the Hall effect sensor 206 generates a unique voltage gradient when the joystick 302 couples to the receiver 204. While in this example the joystick may include different Hall-effect-sensor magnets, in other instances the joysticks 202 and 302 may include equivalent Hall-effect-sensor magnets such that the handheld controller and/or the system(s) to which the controller couples may treat the joysticks 202 and 302 the same for purposes of operation of any applications being controlled by the controller. Therefore, a user may choose a joystick that he or she prefers (e.g., convex, concave, flat, etc.) without changing the functionality of the control relative to other joysticks.

Figure 4:
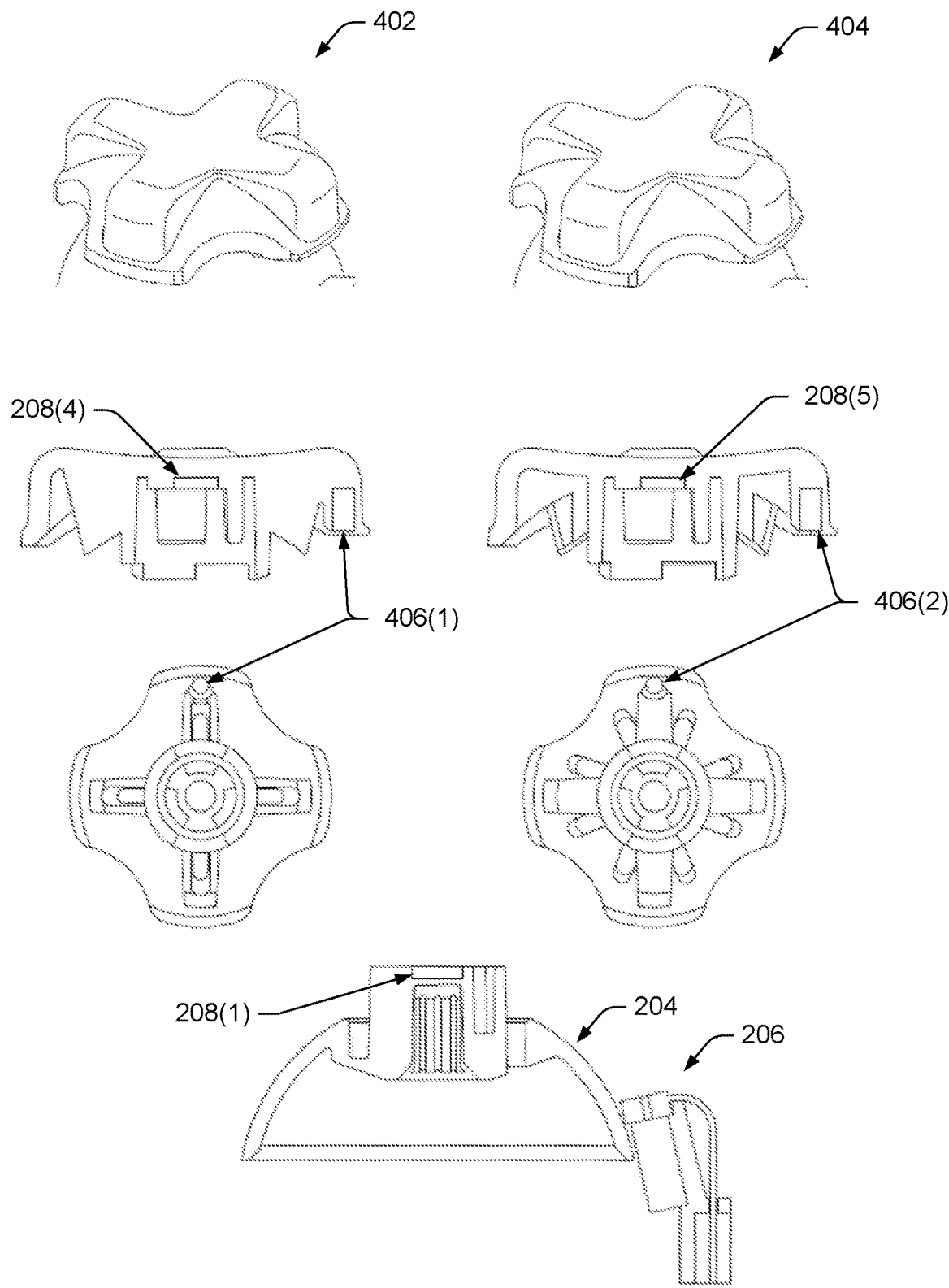
FIG. 4 illustrates perspective, cross-sectional-side, and cross-sectional-top views of two different detachable D-pads, as well as a cross-sectional view of a receiver of the handheld controller that may be configured to receive each of the different D-pads.

FIG. 4 illustrates perspective, cross-sectional-side, and cross-sectional-top views of two different detachable D-pads, as well as a cross-sectional view of a receiver of the handheld controller that may be configured to receive each of the different D-pads. As illustrated, FIG. 4 illustrates a D-pad 402 that may be configured to move in four directions (e.g., the four cardinal directions) when coupled to the receiver 204 and a D-pad 404 that may be configured to move in eight directions (e.g., the four cardinal directions and the four intercardinal directions) when coupled to the receiver 204. Of course, while two example D-pads are described, it is to be appreciated that other D-pads having any other range of motion may be also be used.

In order to disambiguate these two controls from another, and from other controls configured to detachably couple to the receiver, these D-pads may include different Hall effect sensor magnets. As illustrated, the D-pad 402 includes a Hall-effect-sensor magnet 406(1) disposed near an edge of the D-Pad. The D-pad 404, meanwhile, includes a Hall-effect-sensor magnet 406(2), also disposed near an edge of the D-Pad. In some instances, these magnets may be located (e.g., molded into) a side of the control that is nearest the Hall effect sensor 206 to enable the Hall effect sensor 206 to generate the voltage data used to identify the control currently coupled to the handheld controller.

Further, in some instances the magnetic configuration of the Hall-effect-sensor magnet 406(1) may differ from the magnetic configuration of the Hall-effect-sensor magnet 406(2). For instance, the poles may be oriented opposite one another, the magnetic strengths may differ, the location on the respective control may different, and/or the like. Further, in some instances, the controls may use different numbers of Hall-effect-sensor magnets relative to one another. In any event, these magnets may be used to identify whether the D-pad 402, the D-pad 404, or another control is currently coupled to the controller. In addition, the D-pads 402 and 404 may respectively include magnets 208(4) and 208(5) (which may be the same or different) for detachably securing the respective control to the receiver 204 via the magnet 208(1).

Figure 5:
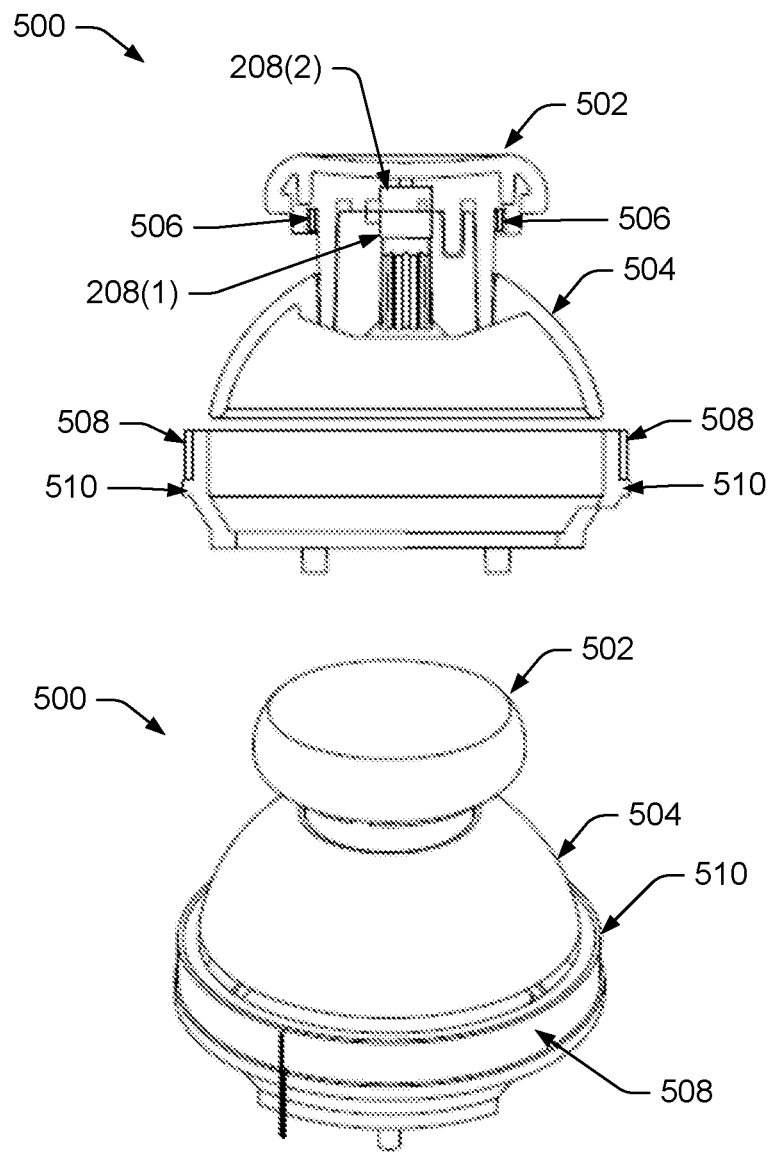
FIG. 5 illustrates an example where the receiver includes RFID functionality for identifying which control, such as the detachable joystick, is currently coupled to the receiver. In this example, a concave joystick is illustrated as coupling to the receiver.

FIG. 5 illustrates an example assembly 500 that includes an example control, in this case a joystick 502, coupling to a receiver 504 that includes RFID functionality for identifying which control, such as the detachable joystick 502, is currently coupled to the receiver 504. In order to identify a control via RFID, in some instances the housing of the controller, such as a portion of the housing that is adjacent the receiver 504 or otherwise, may include an RFID reader configured to send interrogator signals to RFID tags and receive, in response, identification data in the form of modulated signals. Therefore, each control (or class of control) that is configured to detachably couple to the receiver may include a unique RFID tag configured to receive an interrogating signal from the RFID reader and send back its identification information. Furthermore, while the above example describes the receiver 504 sending interrogating signals to passive tags, it is to be appreciated that any other form of RFID (e.g., passive readers, active tags, etc.) may be utilized.

As illustrated, the example joystick 502 includes an RFID tag 506 (e.g., including an RF coil and an integrated circuit (IC)) configured to receive an interrogating signal from an RFID reader 508 (e.g., an RF coil and IC) and transmit a signal encoding its identification data in response. This identification data received by the RFID reader 508 may then be used by the handheld controller or another system to identify which control is currently coupled to the controller. In some instances, the RFID reader 508 forms a portion of or is otherwise adjacent to the receiver 504. Here, the RFID reader 508 includes a coil that is housed in a RFID bobbin 510. Furthermore, in some instances the RFID tag 506 may form a portion of integrated component that includes a magnet for coupling the control to the receiver. That is, the RFID tag 506 may form a portion of a component configured to perform the RFID-tag functions discussed above and the function of the magnet 208(2). Alternatively, in other implementations, the RFID tag 506 may reside at or near the location of the illustrated magnet 208(2), without functioning as the magnet 208(2).

Figure 6:
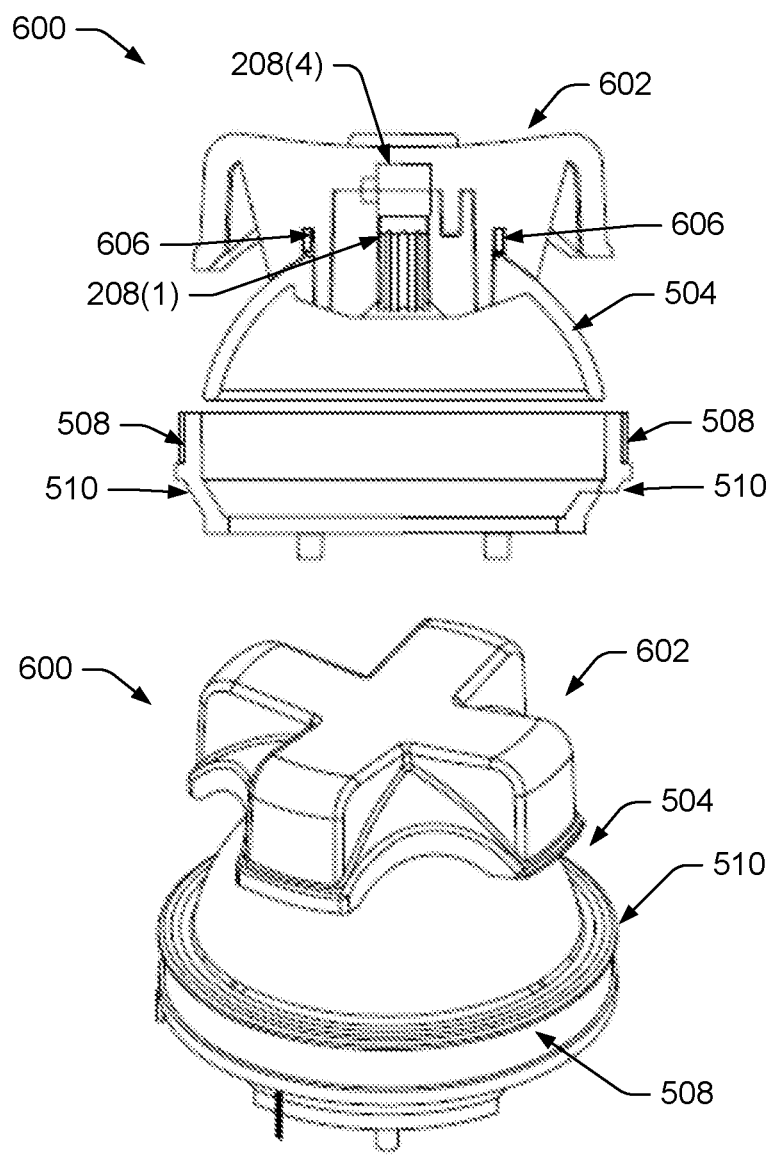
FIG. 6 illustrates another example where the receiver includes RFID functionality for identifying which control, such as the detachable D-pad, is currently coupled to the receiver. In this example, a four-way D-pad is illustrated as coupling to the receiver.

FIG. 6 illustrates an example assembly 600 that includes an example control, in this case a D-pad 602, coupling to the receiver 504 that includes the RFID functionality for identifying which control, such as the detachable D-pad 602, is currently coupled to the receiver 504. Again, in order to identify the control via RFID, the D-pad 602 includes an RFID tag 606 while the receiver 504 or another portion of the housing includes the RFID reader 508 configured to send interrogator signals to the tag 606. In response, the RFID tag may send its identification data in the form of a modulated signal back to the reader 508. This identification data received by the RFID reader 508 may then be used by the handheld controller or another system to identify which control is currently coupled to the controller. Again, the RFID reader 508 may form a portion or otherwise be adjacent to the receiver 504. Here, the RFID reader 508 includes a coil that is housed in a RFID bobbin 510. Furthermore, in some instances the RFID tag 606 may form a portion of integrated component that includes a magnet for coupling the control to the receiver. That is, and as described above, the RFID tag 606 may form a portion of a component configured to perform the RFID-tag functions discussed above and the function of the magnet 208(4).

Figure 7:
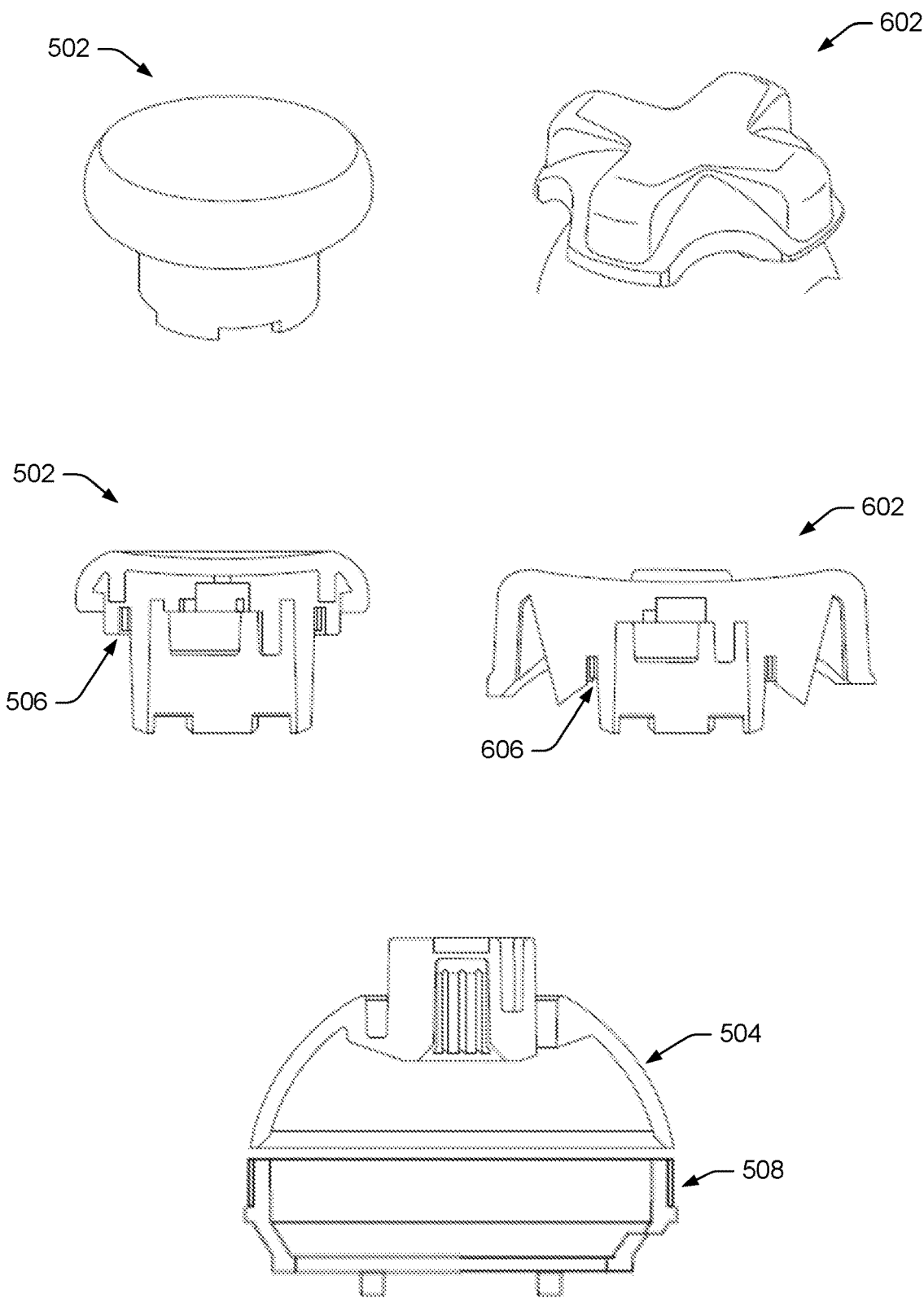
FIG. 7 illustrates perspective and cross-sectional views of a detachable joystick and a detachable D-pad, as well as a cross-sectional view of the receiver of the handheld controller configured to receive each of the detachable controls.

FIG. 7 illustrates perspective and cross-sectional views of the example detachable joystick 502 and the example detachable D-pad 602, as well as a cross-sectional view of the receiver 504 of the handheld controller configured to receive each of the detachable controls. This figure serves to illustrate that a user may swap out the joystick 502 for the D-pad 602 and/or for any other control having an RFID coupled thereto and, in response, the RFID reader 508 may receive, from the tag, RFID identification data for identifying the coupled control. For instance, if the joystick 502 couples to the receiver 504, the RFID tag 506 of the joystick 502 may receive the interrogating signal from the RFID reader 508 and, in response, modulate a signal that encodes its identification data. Similarly, if the D-pad 602 couples to the receiver 504, the RFID tag 606 of the D-pad 602 may receive the interrogating signal from the RFID reader 508 and, in response, modulate a signal that encodes its identification data.

Figure 8:
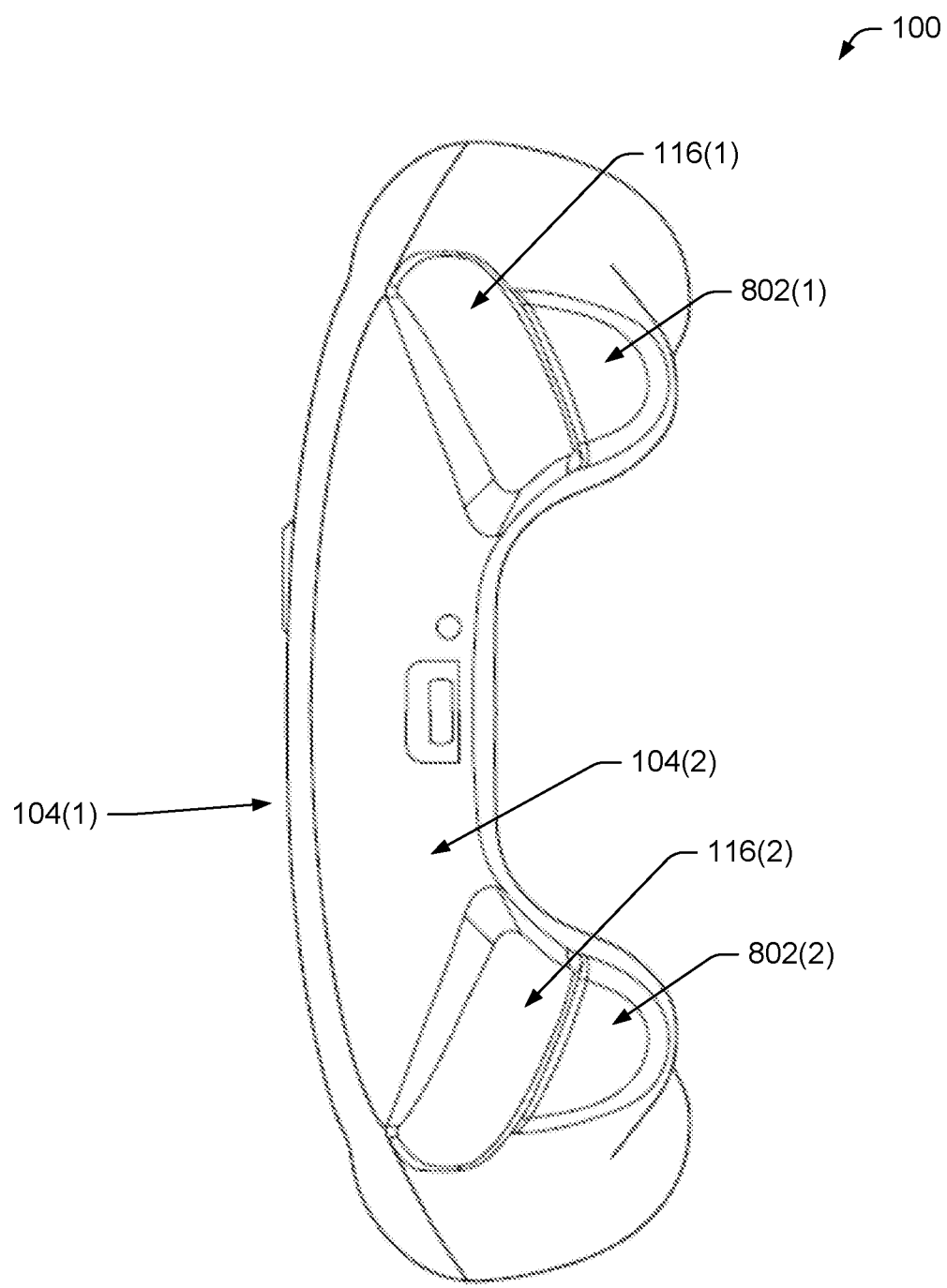
FIG. 8 is a top view of the example handheld controller of FIG. 1.

FIG. 8 is a top view of the example handheld controller 100 configured to implement the techniques described herein. As illustrated, the top surface 104(2) may include an additional left top-surface control 802(1) operable by a left finger of the user and an additional right top-surface control 802(2) operable by a right finger of the user. In some instances, both the additional left top-surface control 802(1) and the additional right top-surface control 802(2) may include a touch sensor for detecting the presence, position, and/or gesture of a finger on the control in addition to, or instead of, the touch sensors residing on the top-surface controls 116(1) and/or 116(2).

Figure 9:
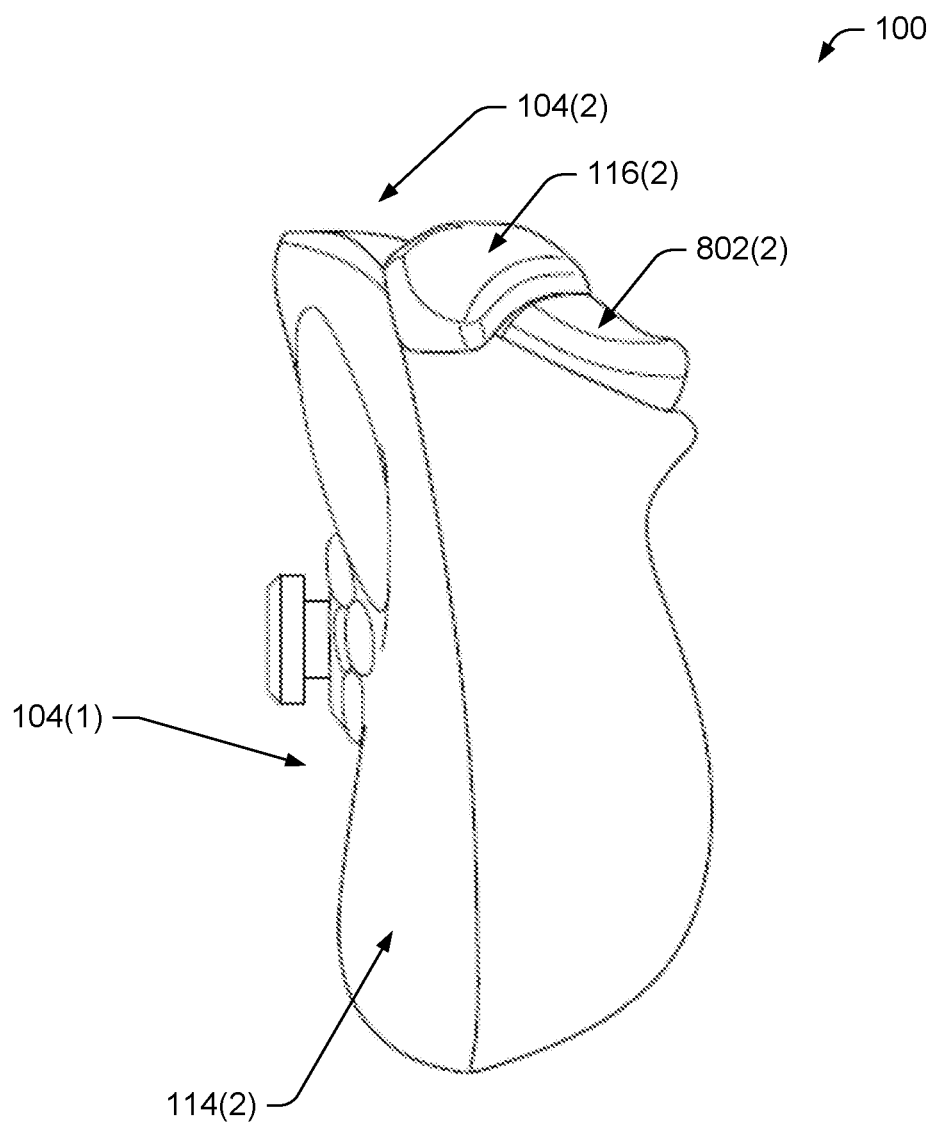
FIG. 9 is a side view of the example handheld controller of FIG. 1.

FIG. 9 is a side view of the example handheld controller 100. As illustrated, the side view illustrates the right handle 114(2) and the right top-surface controls 116(2) and 802(2). One or more of the controls 116(2) and 802(2) may be touch-sensitive and/or pressure-sensitive to identify the presence, position, and/or gestures of one or more fingers on the control(s).

Figure 10:
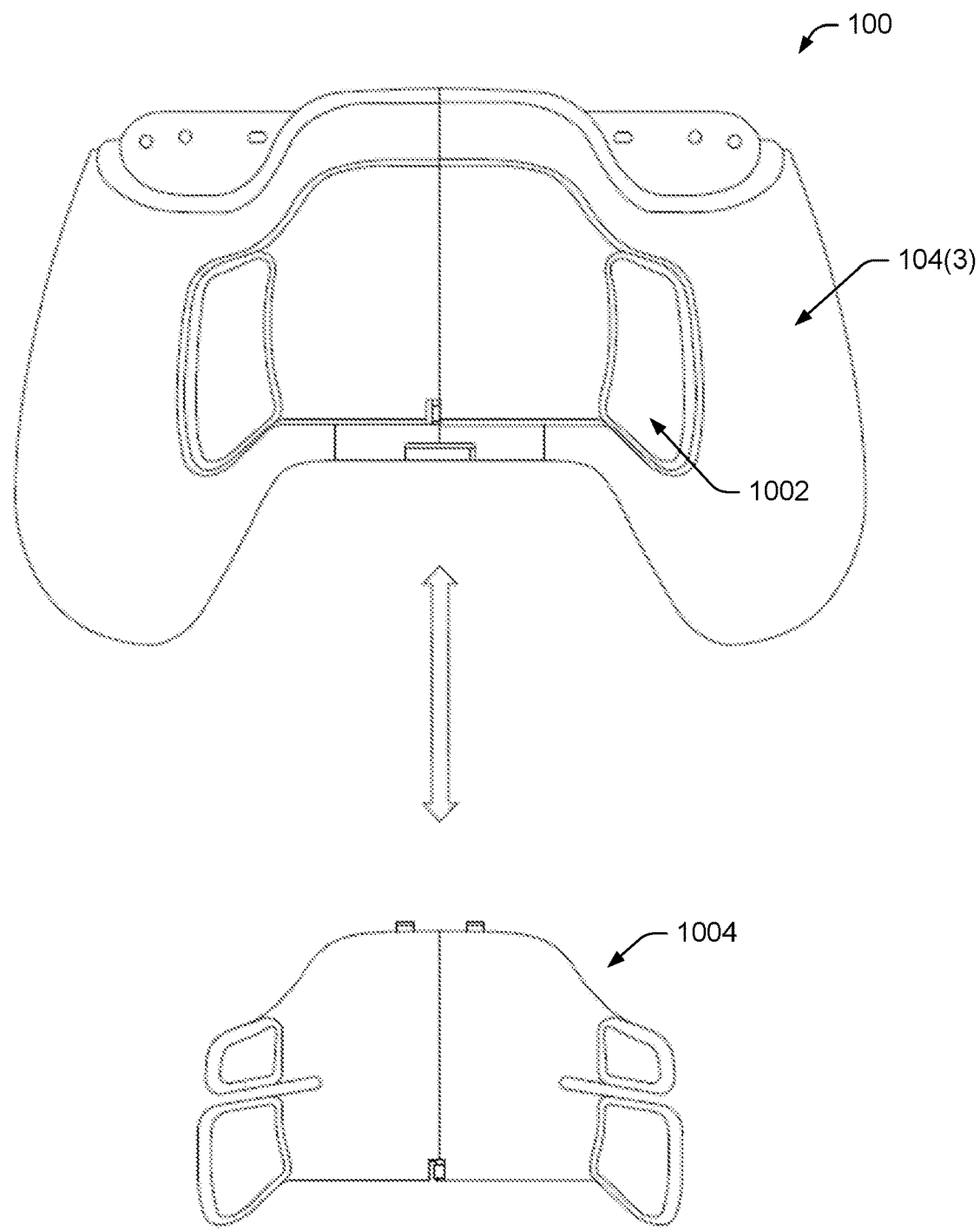
FIG. 10 is a back view of the example handheld controller of FIG. 1. In this example, the controller includes a back cover having two buttons, while this figure also illustrates a back cover having four buttons that may be swapped for the two-button back cover in some instances.

FIG. 10 is a back view of the example handheld controller 100 of FIG. 1. In this example, the controller includes a back surface 104(3) that includes a receiver portion for receiving different types of back-cover controls (or "back covers"). For instance, this back-surface receiver may receive a back cover 1002 having two buttons, a back cover 1004 having four buttons, and/or the like. In each instance, a back-cover control, such as the two-button back cover 1002, may be swapped within another back-cover control, such as the back cover 1004. Of course, while FIG. 10 illustrates two examples of back-cover controls, in other instances a swappable back-cover control may include any other number of selectable buttons. Furthermore, similar to the techniques described above with reference to the illustrated controls 110, the handheld controller 100 may be configured to acquire data indicative of which back cover currently couples to the controller. The handheld controller or another system may then use this data to make this determination, which in turn may be used by an application being operated via the controller 100.

In some instances, the controller 100 may determine which back-cover control couples to the controller 100 using similar or the same techniques described above with reference to the illustrated controller 100. For example, the back surface 104(3) of the housing of the controller 100 may include or be adjacent to a Hall effect sensor, an RFID reader, an optical sensor, and/or the like. Each of these components may be configured to generate data for use in identifying which back-cover control currently couples to the controller 100. To do so, each back-cover control may include a particular magnetic configuration, a unique RFID tag, and/or other information used to identify the particular cover.

Figure 11:
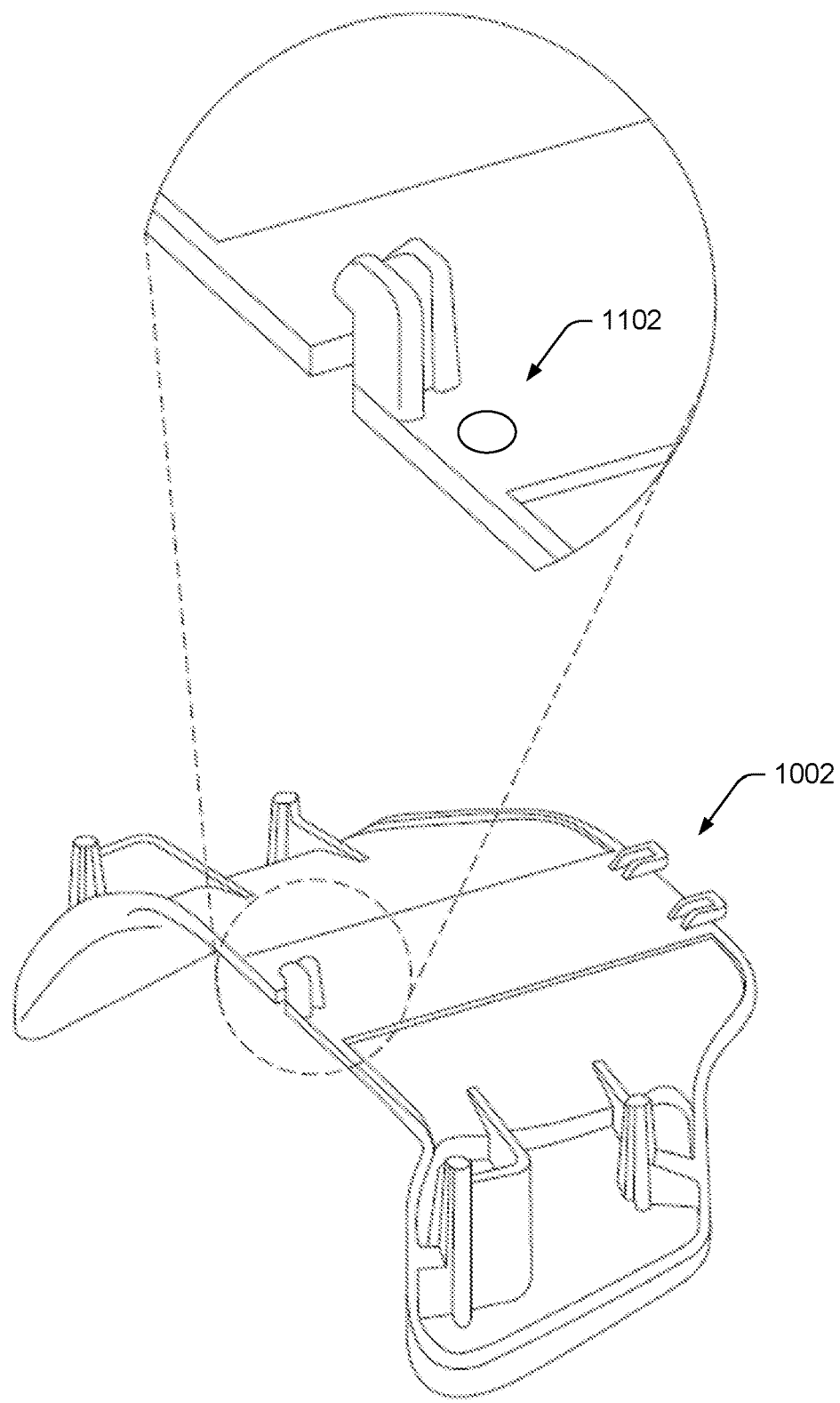
FIG. 11 illustrates a perspective view of the example two-button back cover. In this instance, the back cover includes a magnet that may be used by the handheld controller to identify the two-button cover when this cover couples to the controller.

FIG. 11, for example, illustrates a perspective view of the example two-button back cover 1002. In this instance, the back cover 1002 includes a Hall-effect-sensor magnet 1102 that may be used by the handheld controller to identify the two-button cover 1002 when this cover couples to the controller 100. That is, a Hall-effect-sensor, similar to the Hall effect sensor 206 but located nearer the back surface 104(3) of the controller, may generate a voltage gradient based on the magnetic configuration of the magnet 1102. This voltage gradient may be used to uniquely identify the back-cover control 1002. The back-cover control 1004 may similarly include a unique Hall-effect-sensor magnet (or magnetic configuration) for use in identifying the back cover 1004, and so forth.

Figure 12:
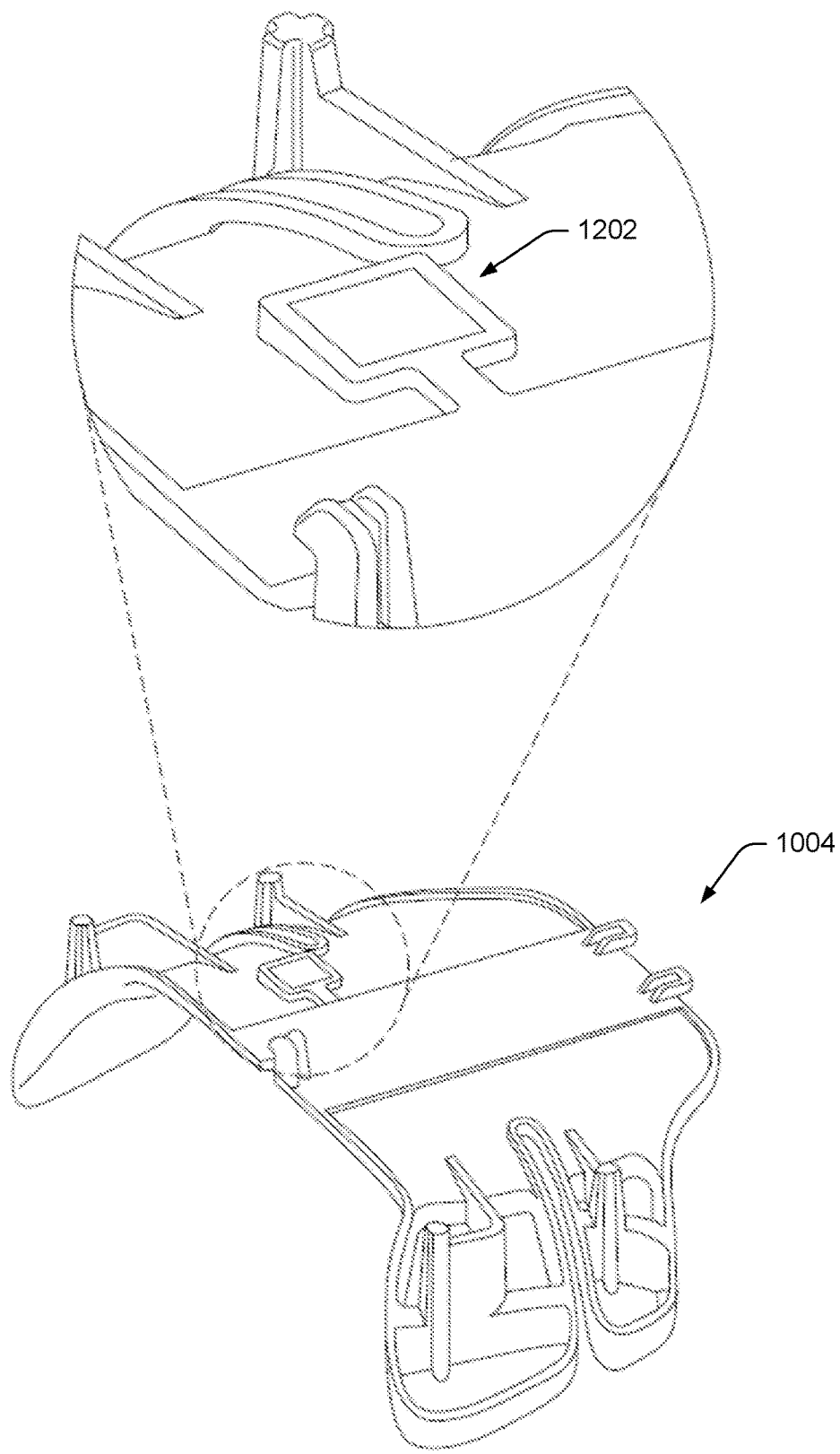
FIG. 12 illustrates a perspective view of the example four-button back cover. In this instance, the back cover includes an RFID chip that may be used by the handheld controller to identify the four-button cover when this cover couples to the controller.

FIG. 12, meanwhile, illustrates a perspective view of the example four-button back cover 1004. In this instance, the back cover 1004 includes an RFID tag 1202 that may be used by the handheld controller to identify the four-button cover 1004 when this cover couples to the controller 100. That is, an RFID reader similar to the readers described above but located nearer the back surface 104(3) of the controller, may transmit an interrogating signal that is received and modulated back by the RFID tag 1202. This modulated signal may be used to uniquely identify the back-cover control 1004. The back-cover control 1002 may similarly include a unique RFID tag for use in identifying the back cover 1002, and so forth.

Figure 13:
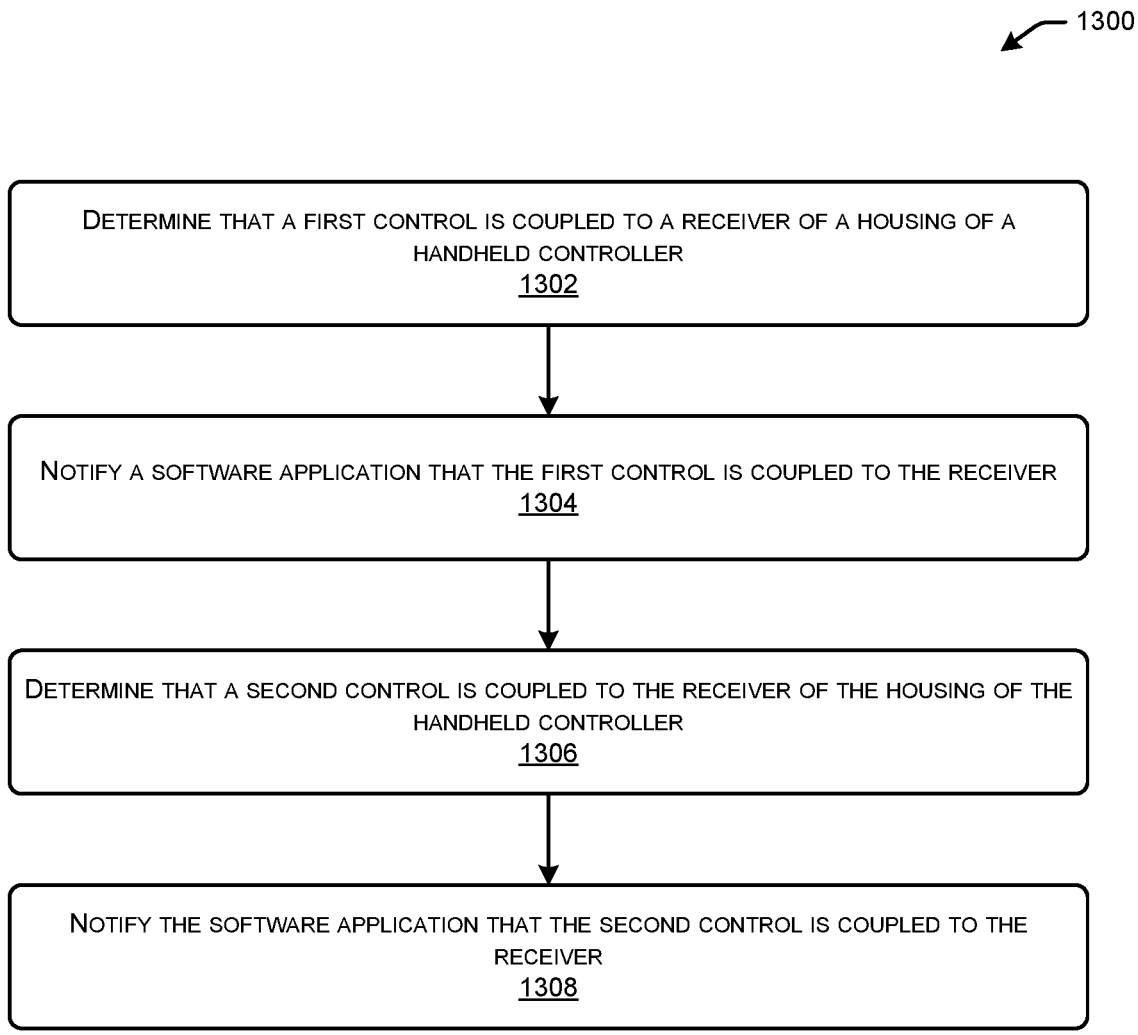
FIG. 13 is a flow diagram of an example process for enabling the swapping of controls on the handheld controller using the techniques described herein.

FIG. 13 is a flow diagram of an example process 1300. The process 1300 is described as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

An operation 1302 represents determining that a first control is coupled to a receiver of a housing of a handheld controller. This operation may be performed in a variety of ways. For instance, a component of the handheld controller may generate data that uniquely identifies the first control, and may use that data to determine an association between the data a unique control ID or may send this data to another system for making this determination. This data may comprise voltage data measured by Hall effect sensor, RFID data received by an RFID reader, optical data, resistive data, control-usage data indicating how the control is being used, and/or any other type of data that may be used to uniquely identify the currently coupled control.

An operation 1304, meanwhile, represents notifying a software application, which the controller may currently be operating, that the handheld controller is currently coupled to the first control. For instance, the controller may provide this notification or another system, such as a game console, a remote server, or the like, may provide this notification. The software application, meanwhile, may use this information in a variety of ways. For example, the software application may utilize certain scaling parameters based on this information such that, for example, movement within a particular game is done correctly. In another example, the software application may recommend content or the like to a user based on the current configuration of the controller. For instance, the software application may determine which applications (e.g., games) are compatible or recommended for the current configuration of the controller and may recommend these applications to the user of the controller. Of course, while a few examples have been described, it is to be appreciated that the software application may use this information in any other manner.

An operation 1306 represents determining that a second control is coupled to the receiver of the housing of the handheld controller. Again, this operation may be performed in a variety of ways. For instance, a component of the handheld controller may generate data that uniquely identifies the second control, and may use that data to determine an association between the data and a unique control ID or may send this data to another system for making this determination. This data may comprise voltage data measured by Hall effect sensor, RFID data received by an RFID reader, optical data, resistive data, control-usage data indicating how the control is being used, and/or any other type of data that may be used to uniquely identify the currently coupled control.

Finally, an operation 1308 represents notifying the software application that the handheld controller is now coupled to the second control. For instance, the controller may provide this notification or another system, such as a game console, a remote server, or the like, may provide this notification. Again, the software application may use this information in a variety of ways. For example, the software application may update certain scaling parameters based on this information such that movement within a particular game continues to be performed correctly. In another example, the software application may recommend content or the like to a user based on the new configuration of the controller. For instance, the software application may determine which applications (e.g., games) are compatible or recommended for the current configuration of the controller and may recommend these applications to the user of the controller. Again, while a few examples have been described, it is to be appreciated that the software application may use this information in any other manner.

Figure 14:
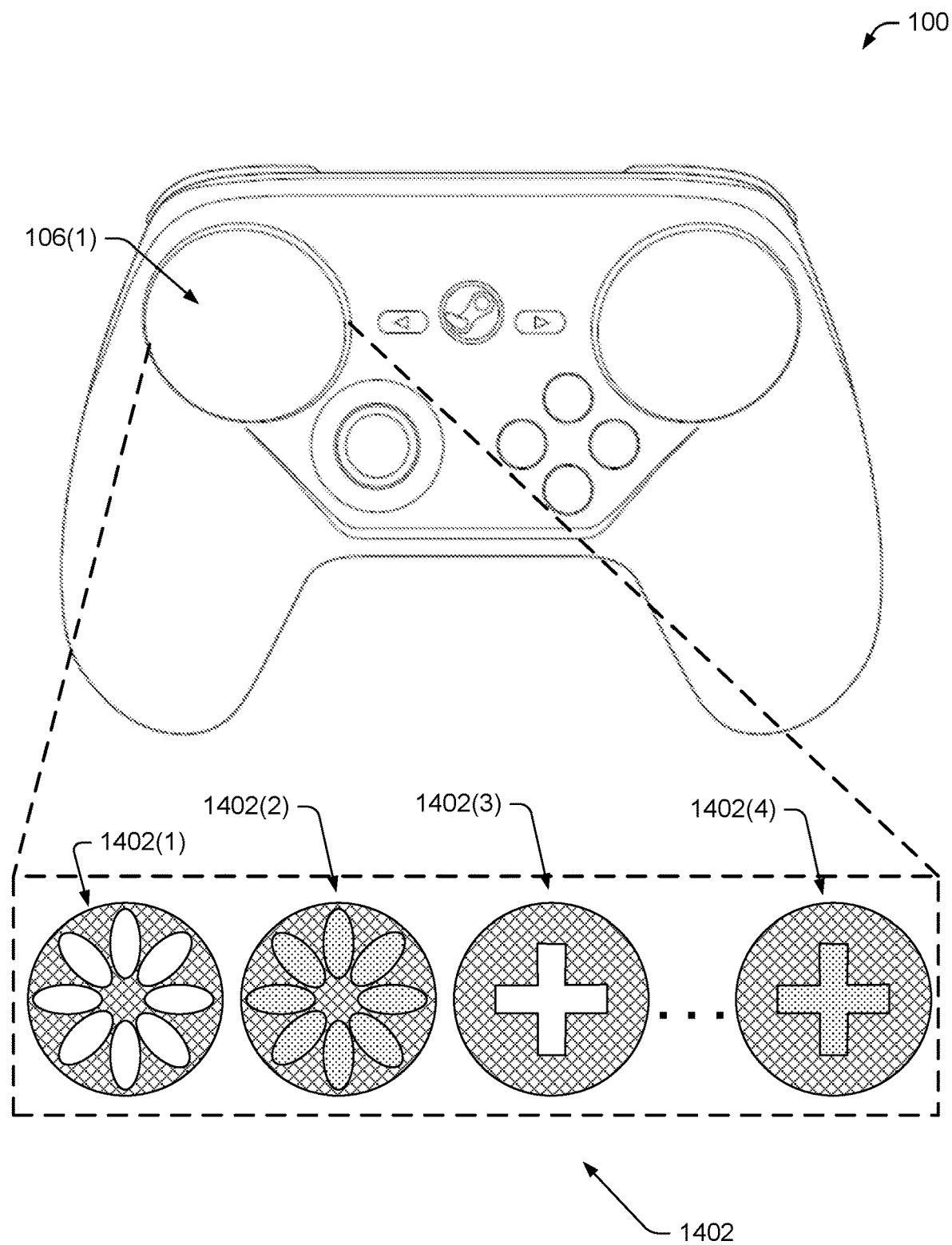
FIG. 14 is a front view of an example handheld controller that includes, in part, a trackpad and different overlays that are configured to detachably couple to the trackpad and function as respective controls of the handheld controller.

FIG. 14 is a front view of the example handheld controller 100 that includes, in part, the trackpad 106(1) and 106(2), each of which may detachably couple to one of multiple different overlays 1402. In some instances, the overlays 1402 may couple to the trackpad(s) magnetically, via an interference fit, via an adhesive, or in any other manner. In some instances, the housing of the controller 100 may include a first magnet proximate to the trackpad(s), the respective overlay may include a second magnet oriented opposite the first magnet to cause the overlay to "snap on" to the trackpad or housing. In other instances, the housing or the overlay may include one of a magnet or a magnetic material, while the other of the housing or the overlay may include the other of the magnet or the magnetic material.

In some instances, the overlay has a substantially similar shape as the trackpad to which it couples. In the illustrated example, for instance, the trackpad 106(1) is circular, as is each of the overlays 1402. Further, the overlay may include a first portion that is configured to mask detection of a finger by the trackpad 106(1) and a second portion that is configured to enable detection of the finger by the trackpad 106(1). For instance, the first portion of the overlay may comprise an insulative material that weakens a signal (e.g., a capacitive, conductive, or resistive signal) received by the top surface of the trackpad 106(1) such that the trackpad does not identify the touch. The overlay may further include a second portion, however, that enables the detection of the finger. For example, the first portion of the overlay may comprise an insulative material, while the second portion may comprise a recess that exposes a particular portion of the top surface of the trackpad 106(1). In other instances, the first portion may comprise the insulative material, while the second portion may comprise a capacitive or conductive material that when pushed down on by the user makes contact with the trackpad 106(1), causing the trackpad to recognize the touch. In some instances, the overlay may include the capacitive or conductive elements on a bottom surface of the overlay such that these elements make contact upon a push by the user.

FIG. 14 illustrates several example overlays, including a first overlay 1402(1) that includes recesses in an insulative material in a radial pattern. That is, the first overlay 1402(1) may be formed of an insulative material but may include recesses or "cut-outs" (i.e., holes), through which a finger of a user may extend or protrude. Therefore, when the first overlay 1402(1) couples to the trackpad 106(1), the user may select the portions of the top surface of the trackpad 106(1) that reside underneath the recesses, while not being able to select the remaining portions of the top surface of the trackpad 106(1) (which is covered by the insulative material of the overlay 1402(1). FIG. 14 also illustrates a second overlay 1402(2), which also includes a radial pattern. In this example, however, the overlay 1402(2) includes conductive or capacitive elements in the radial pattern such that when the user presses down on these elements, contact with the trackpad 106(1) is made and the touch is detected. Again, however, touches on the overlay 1402(2) other than at these locations are not detected by the trackpad 106(1).

FIG. 14 further illustrates an example third overlay 1402(3). In this example, the overlay 1402(3) comprises an insulative material having a cross-shaped recess. Thus, when coupled to the trackpad 106(1), the user is able to use the trackpad 106(1) to provide left, right, up, and down commands. A fourth overlay 1402(4), meanwhile, enables the same commands, but includes a conductive or capacitive material in the form of the cross rater than the recess shown in the third overlay 1402(3).

Figure 15:
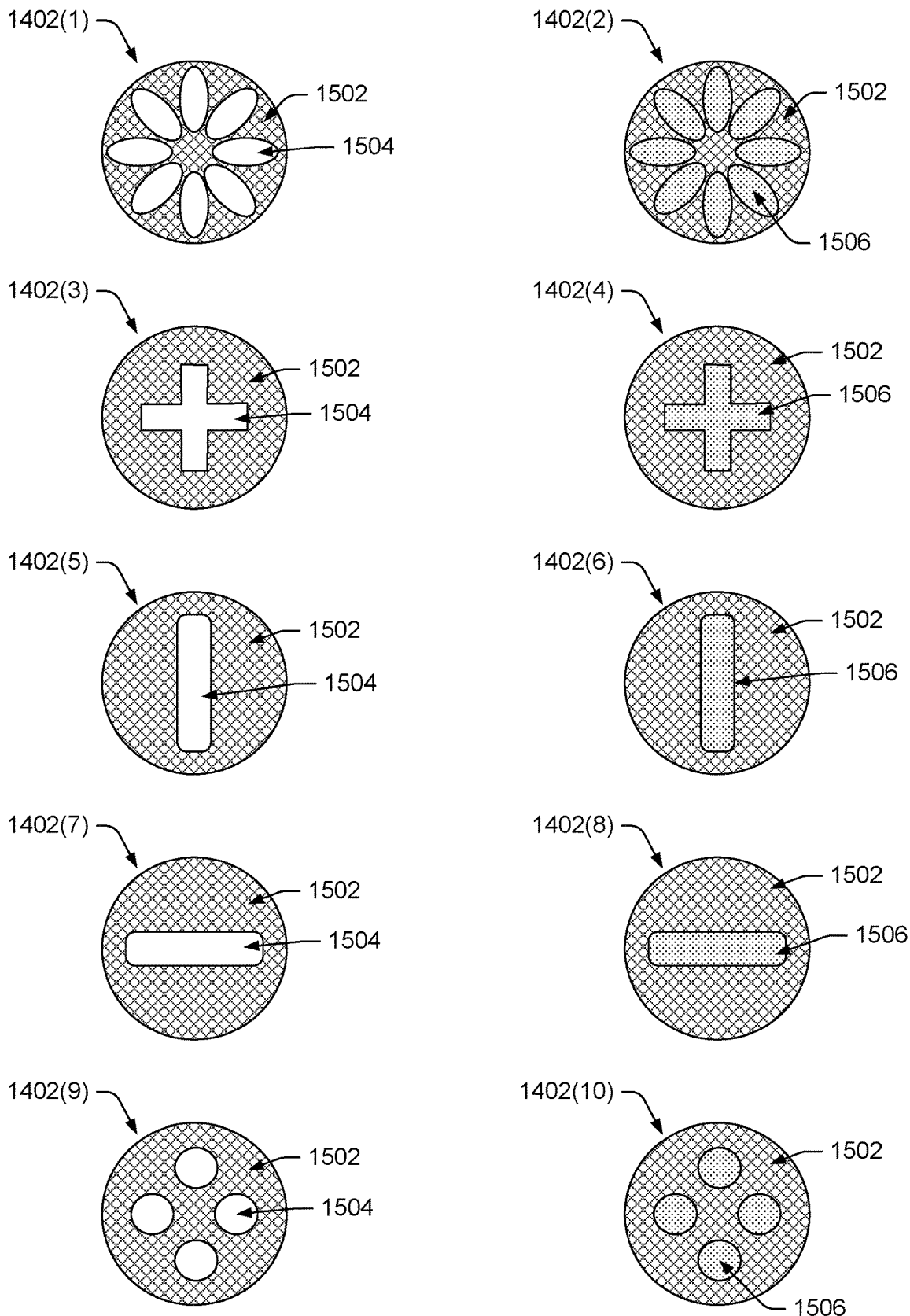
FIG. 15 illustrates example overlays that may detachably couple to trackpads of handheld controllers.

FIG. 15 illustrates additional example overlays that may detachably couple to trackpads of handheld controllers, such as the trackpad 116(1) and/or 116(2) of the controller 100. For example, FIG. 15 again illustrates the example overlay 1402(1). As illustrated, this overlay includes a first portion 1502 that is configured to mask detection of a touch input at a trackpad and a second portion 1504 that is configured to enable detection. Again, in this example the first portion may comprise an insulative material while the second portion may comprise a recess or cut-out. The second overlay 1402(1), meanwhile, includes the insulative first portion 1502 as well as a conductive or capacitive second portion 1506. Again, as opposed to including the recess, this overlay includes capacitive and/or conductive elements that make contact with a trackpad disposed underneath the overlay, thus allowing for detection of the touch.

FIG. 15 further illustrates the third overlay 1402(3) having the first portion 1502 and the second portion 1504, comprising a cut-out in the form of a cross. The overlay 1402(4), meanwhile, comprises the first portion 1502 and the second, capacitive and/or conductive portion 1506 for enabling detection of the touch at the specified locations of the trackpad. In addition, FIG. 15 illustrates an example fifth overlay 1402(5), which may include the first portion 1502 formed of an insulator and the second portion 1504 comprising a vertical recess or cut-out to enable the user to provide up and down input on the underlying trackpad 106(1). Similarly, a sixth overlay 1402(6) may comprise a conductive or capacitive second portion 1506 in the form of the vertical line to enable the up/down input by the user.

Similar to these vertical overlays, FIG. 15 illustrates an example seventh overlay 1402(7) that includes a horizontal recess or cut-out and an eight overlay 1402(8) that comprises a conductive or capacitive element disposed in a horizontal manner. Each of these overlays may allow a user to provide left and right input to the trackpad 106(1) to which the overlay couples. Finally, FIG. 15 illustrates an example ninth overlay 1402(9) and tenth overlay 1402(10), each of which enable a user to provide input to multiple portions of the trackpad 106(1) that each effectively function as a respective button. That is, in this example the trackpad 106(1) may be able to detect a user's finger at each of the four illustrated circles and may interpret each touch similar to the touch of a press-down button. For instance, the example configuration may correspond to an A/B/X/Y button configuration, albeit with use of the trackpad 106(1). While FIG. 15 shows several example overlay configurations, it is to be appreciated that any other type of overlay be used to generate any type of control when coupled to a trackpad of a handheld controller. In addition, while FIG. 15 illustrates overlays that may couple to a trackpad, in other instances the described overlays may couple to other touch-sensitive controls on the handheld controller, such as the top-surface controls, or the like.

FIG. 16 is a flow diagram of an example process 1600 for forming a handheld controller that includes an overlay configured to detachably couple to a trackpad of the handheld controller. An operation 1602 comprises forming a housing of a handheld controller. The housing may be formed of any suitable material, such as plastic. After forming the housing, at an operation 1604 a trackpad comprising a top surface may be coupled to the housing, with the trackpad being configured to detect touch inputs at a top surface of the trackpad. For instance, the trackpad may be configured to detect position(s) of one or more fingers of a user as the user moves their finger(s) about the top surface of the trackpad.

An operation 1608, meanwhile, represents forming an overlay configured to detachably couple to at least one of the housing or the trackpad. The overlay may be formed of any suitable material, such as insulative materials, capacitive materials, conductive materials, and/or combinations thereof. Further, the overlay may comprise a first portion configured to mask detection of the position of the finger at a first portion of the top surface of the trackpad and a second portion configured to enable detection of the position of the finger at a second portion of the top surface of the trackpad. The first portion of the overlay may comprise an insulative material, while the second portion of the overlay may comprise one or more recesses in the insulative material, one or more capacitive elements on a bottom surface of the overlay, one or more conductive elements on the bottom surface of the overlay, and/or the like.

An operation 1608 represents forming a second overlay that is also configured to detachably couple to at least one of the housing or the trackpad. The second overlay may be formed of any suitable material, such as insulative materials, capacitive materials, conductive materials, and/or combinations thereof. Further, the second overlay may also comprise a first portion configured to mask detection of the position of the finger at a third portion of the top surface of the trackpad and a second portion configured to enable detection of the position of the finger at a fourth portion of the top surface of the trackpad. In some instances, the configuration of the first and second overlays differ from one another such that each overlay effectively transforms the touchpad into a different respective control. While the process 1600 describes forming two overlays, it is to be appreciated that any other number and/or configuration of overlay may be formed, which may be interchangeably swapped out onto the trackpad(s) of a handheld controller as desired by the user.

Figure 17:
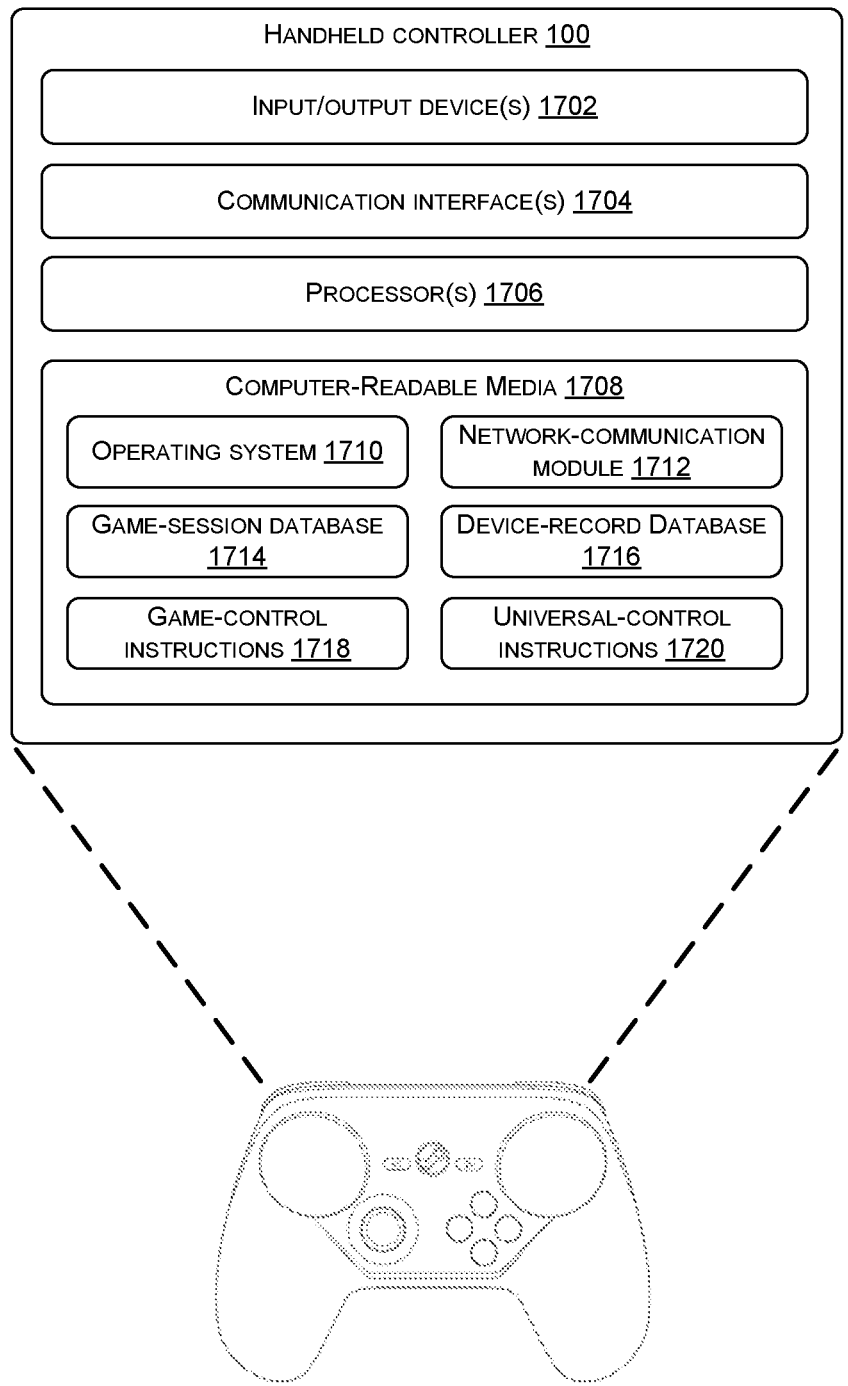
FIG. 17 illustrates example components of a handheld controller, such as the controller of FIGS. 1 and 14.

FIG. 17 illustrates example components of a handheld controller, such as the controller 100. As illustrated, the handheld controller includes one or more input/output (I/O) devices 1702, such as the controls described above (e.g., joysticks, trackpads, triggers, detachable controls, fixed controls, etc.), and potentially any other type of input or output devices. For example, the I/O devices 1702 may include one or more microphones to receive audio input, such as user voice input. In some implementations, one or more cameras or other types of sensors (e.g., inertial measurement unit (IMU)) may function as input devices to receive gestural input, such as motion of the handheld controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively comprise any other type of output device.

In some instances, output by the one or more output devices may be based on input received by one or more of the input devices. For example, selection of a top-surface control may result in the output of a haptic response by a vibrator located adjacent (e.g., underneath) the top-surface control or at any other location. In some instances, the output may vary based at least in part on a characteristic of a touch input on a touch sensor, such as the touch sensor associated with the top-surface control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the top-surface control may result in a first type of haptic output, while a tap on the top-surface control (detected by the touch sensor) may result in a second type of haptic output, while a hard press of the top-surface control may result in a third type of haptic output.

In addition, the handheld controller 100 may include one or more communication interfaces 1704 to facilitate a wireless connection to a network and/or to one or more remote systems (e.g., a host computing device executing an application, a game console, etc.). The communication interfaces 1704 may implement one or more of various wireless technologies, such as Wi-Fi, Bluetooth, radio frequency (RF), and so on. It is to be appreciated that the handheld controller 100 may further include physical ports to facilitate a wired connection to a network, a connected peripheral device, or a plug-in network device that communicates with other wireless networks.

In the illustrated implementation, the handheld controller further includes one or more processors 1706 and computer-readable media 1708. In some implementations, the processors(s) 1706 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1706 may possess its own local memory, which also may store program modules, program data, and/or one or more operating systems.

The computer-readable media 1708 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 1708 may be implemented as computer-readable storage media ("CRSM"), which may be any available physical media accessible by the processor(s) 1706 to execute instructions stored on the computer-readable media 1708. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1706.

Several modules such as instruction, datastores, and so forth may be stored within the computer-readable media 1708 and configured to execute on the processor(s) 1706. A few example functional modules are shown as stored in the computer-readable media 1708 and executed on the processor(s) 1706, although the same functionality may alternatively be implemented in hardware, firmware, or as a system on a chip (SOC).

An operating system module 1710 may be configured to manage hardware within and coupled to the handheld controller 100 for the benefit of other modules. In addition, the computer-readable media 1708 may store a network-communications module 1712 that enables the handheld controller 100 to communicate, via the communication interfaces 1704, with one or more other devices, such as a personal computing device executing an application (e.g., a game application), a game console, a remote server, or the like. The computer-readable media 1708 may further include a game-session database 1714 to store data associated with a game (or other application) executing on the handheld controller or on a computing device to which the handheld controller 100 couples. The computer-readable media 1708 may also include a device-record database 1716 that stores data associated with devices to which the handheld controller 100 couples, such as the personal computing device, game console, remote server or the like. The computer-readable media 1708 may further store game-control instructions 1718 that configure the handheld controller 100 to function as a gaming controller, and universal-control instructions 1720 that configure the handheld controller 100 to function as a controller of other, non-gaming devices.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A wireless gaming controller comprising:
   one or more communication interfaces configured to facilitate a wireless connection between the wireless gaming controller and a system executing a gaming application;
   a housing;
   a joystick coupled to the housing and configured to provide input to the gaming application;
   multiple depressible buttons coupled to the housing and configured to provide input to the gaming application;
   a vibration component coupled to the housing and configured to provide haptic output on the wireless gaming controller;
   a radio-frequency-identification (RFID) reader coupled to the housing;
   a trackpad coupled to the housing and configured to provide input to the gaming application, the trackpad comprising a top surface and further configured to detect a position of a finger on the top surface of the trackpad; and
   an overlay configured to detachably couple to at least one of the housing or the trackpad, wherein the overlay:
   is configured to cover at least a first portion of the top surface of the trackpad and expose at least a second portion of the top surface of the trackpad when coupled to the at least one of the housing or the trackpad; and
   includes an RFID tag to receive a signal from the RFID reader and send, to the RFID reader, identification information that identifies the overlay;
   and wherein the trackpad is configured to detect the position of the finger at the second portion of the top surface but not at the first portion of the top surface when the overlay couples to the at least one of the housing or the trackpad.

2. The wireless gaming controller of 1, wherein the overlay comprises a first overlay, and further comprising a second overlay configured to detachably couple to the at least one of the housing or the trackpad, the second overlay configured to a cover at least a third portion of the top surface of the trackpad and expose at least a fourth portion of the top surface of the trackpad when coupled to the at least one of the housing or the trackpad, wherein the third portion is different than the first portion and the fourth portion is different than the second portion, and wherein the trackpad is configured to detect the position of the finger at the fourth portion of the top surface but not at the third portion of the top surface when the second overlay couples to the at least one of the housing or the trackpad.

3. The wireless gaming controller of 1, wherein the overlay, when coupled to the at least one of the housing or the touchpad, exposes a substantially cross-shaped portion of the top surface of the trackpad while covering a remaining portion of the top surface of the trackpad.

4. The wireless gaming controller of 1, wherein the overlay, when coupled to the at least one of the housing or the touchpad, exposes a substantially vertical portion of the top surface of the trackpad while covering a remaining portion of the top surface of the trackpad.

5. The wireless gaming controller of 1, wherein the overlay, when coupled to the at least one of the housing or the touchpad, exposes a substantially horizontal portion of the top surface of the trackpad while covering a remaining portion of the top surface of the trackpad.

6. The wireless gaming controller of 1, wherein the overlay, when coupled to the at least one of the housing or the touchpad, exposes multiple circular portions of the top surface of the trackpad while covering a remaining portion of the top surface of the trackpad.

7. The wireless gaming controller of 1, wherein the overlay is configured to magnetically couple to the at least one of the housing or the trackpad.

8. The wireless gaming controller of 1, wherein the overlay is configured to couple to the at least one of the housing or the trackpad via an interference fit.

9. The wireless gaming controller of 1, wherein the trackpad is configured to detect the position of the finger on the top surface of the trackpad based on at least one of a capacitance of the finger or conductance of the finger.

10. The wireless gaming controller of 1, wherein the trackpad and the overlay each comprise a substantially circular shape.

11. A wireless gaming controller comprising:
one or more communication interfaces configured to facilitate a wireless connection between the wireless gaming controller and a system executing a gaming application;
a housing;
a joystick coupled to the housing and configured to provide input to the gaming application;
multiple depressible buttons coupled to the housing and configured to provide input to the gaming application;
a vibration component coupled to the housing and configured to provide haptic output on the wireless gaming controller;
a Hall-effect sensor coupled to the housing;
a trackpad coupled to the housing and configured to provide input to the gaming application, the trackpad comprising a top surface and further configured to detect a position of a finger on the top surface of the trackpad; and
an overlay configured to detachably couple to at least one of the housing or the trackpad, wherein the overlay:
comprises a first material configured to cover a first portion of the top surface of the trackpad and a second material configured to cover a second portion of the top surface of the trackpad when coupled to the at least one of the housing or the trackpad; and
includes a Hall-effect-sensor magnet for generating a magnetic field for identifying the overlay;
and wherein the trackpad is configured to detect the position of the finger at the second portion of the top surface but not at the first portion of the top surface when the overlay couples to the at least one of the housing or the trackpad.

12. The wireless gaming controller of 11, wherein the first material comprises an insulative material and the second material comprises at least one of a capacitive or conductive material.

13. The wireless gaming of 11, wherein the overlay comprises a first overlay, and further comprising a second overlay configured to detachably couple to the at least one of the housing or the trackpad, the second overlay comprising the first material configured to cover a third portion of the top surface of the trackpad and he second material configured to cover a fourth portion of the top surface of the trackpad when coupled to the at least one of the housing or the trackpad, wherein the third portion is different than the first portion and the fourth portion is different than the second portion, and wherein the trackpad is configured to detect the position of the finger at the fourth portion of the top surface but not at the third portion of the top surface when the overlay couples to the at least one of the housing or the trackpad.

14. The wireless gaming of 11, wherein the second material forms a cross shape.

15. The wireless gaming of 11, wherein the first material forms at least one of a vertical line or a horizontal line.

16. The wireless gaming of 11, wherein the first material forms multiple circular portions.

17. The wireless gaming of 11, wherein the overlay is configured to magnetically couple to the at least one of the housing or the trackpad.

18. The wireless gaming of 11, wherein the overlay is configured to couple to the at least one of the housing or the trackpad via an interference fit.

19. The wireless gaming of 11, wherein the trackpad and the overlay each comprise a substantially circular shape.

* * * * *